United States Patent [19]
Nakatani et al.

[11] Patent Number: 5,586,387
[45] Date of Patent: Dec. 24, 1996

[54] AUTOMATED PART ASSEMBLY MACHINE

[75] Inventors: Takuya Nakatani, Hirakata; Mitsutaka Abe, Yahata; Shigeru Dono, Osaka; Youji Urano, Shijonawate, all of Japan

[73] Assignee: Matsushita Electric Works, Ltd., Osaka, Japan

[21] Appl. No.: 360,568

[22] Filed: Dec. 21, 1994

[30] Foreign Application Priority Data

Dec. 22, 1993 [JP] Japan .................................. 5-325460
Sep. 27, 1994 [JP] Japan .................................. 6-231867

[51] Int. Cl.$^6$ .................................................. B23P 21/00
[52] U.S. Cl. .......................... 29/703; 29/720; 29/784; 29/787; 29/795; 901/8
[58] Field of Search ........................ 29/407.04, 407.1, 29/701, 703, 720, 784, 787, 795; 364/468, 478; 901/1, 2, 8; 414/763

[56] References Cited

U.S. PATENT DOCUMENTS

| | | | |
|---|---|---|---|
| 4,275,986 | 6/1981 | Engelberger et al. | |
| 4,503,507 | 3/1985 | Takeda et al. | 901/8 X |
| 5,125,149 | 6/1992 | Inaba et al. | 29/720 X |
| 5,161,936 | 11/1992 | Kato | 901/8 X |
| 5,319,845 | 6/1994 | Watanabe et al. | 29/701 |

FOREIGN PATENT DOCUMENTS

| | | | |
|---|---|---|---|
| 3-184795 | 8/1991 | Japan | 901/8 |
| 4223827 | 8/1992 | Japan . | |
| 6-99321 | 4/1994 | Japan | 29/701 |

OTHER PUBLICATIONS

Kamprath–Reihe, Dr.–Ing. habil. Stefan Hesse, "Montagemaschinen", Grundlagen und Prinzipien in Aufbau, Funktion, Antrieb und Steuerung montierender Maschinen, Vogel Buckverlag.

*Primary Examiner*—S. Thomas Hughes
*Attorney, Agent, or Firm*—Nikaido, Marmelstein, Murray & Oram LLP

[57] ABSTRACT

An automated part assembly machine has a work table supported to a base and movable relative thereto and at least two separate robots each having an end effector movable around within an individual work region. The two robots are positioned in such a relation as to give a common work region in which the individual work regions of the two robots overlap. A parts supply is arranged to the work table for storing parts to be picked-up by the robots. A plurality of operator hands are selectively and removably attached to the end effector of the robot for handling the parts by the robot. Disposed within the common region is a jig which positions the parts for assembly by the robot. The robots and the work table are controlled to operate in cooperation for assembly of the parts. The machine is characterized in that the robots are mounted on the movable work table together with the operator hands and the jig with the robots spaced in the moving direction of the work table, and that the parts supply extends in the moving direction of the work table. Thus, the robots are enabled to move together with the jig and the operator hands relative to the parts supply so that the robots can reach over a wide range of the parts supply beyond the individual work regions to thereby successfully pick-up suitable parts and transfer them to the jig for immediate assembly of the parts. Further, since the operator hands are on the movable work table, the robot can change the operator hands while moving relative to the parts supply for effecting the part assembly substantially without interruption, in addition to the advantage of enabling one robot to change the operator hand while the other robot is handling the parts.

23 Claims, 22 Drawing Sheets

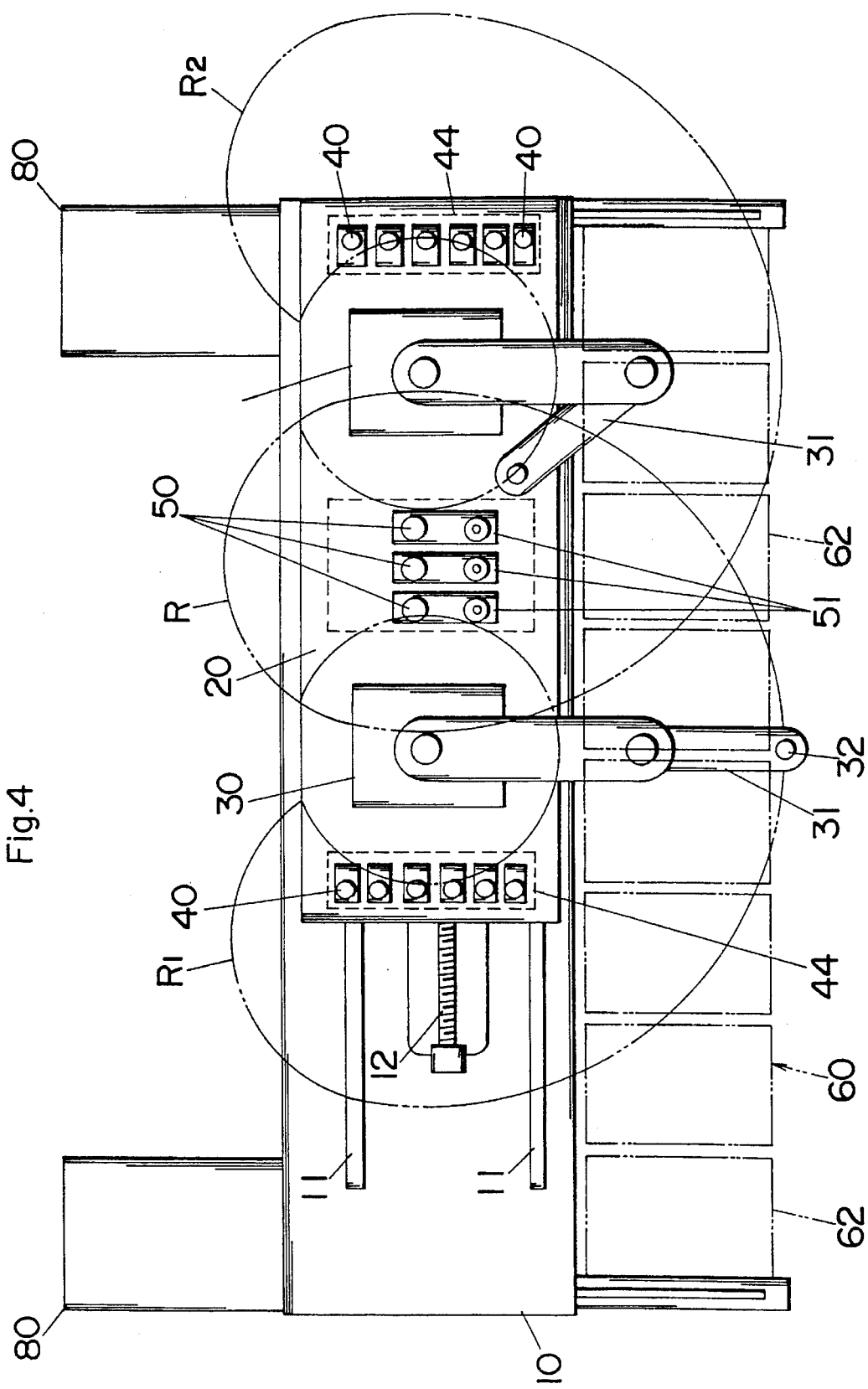

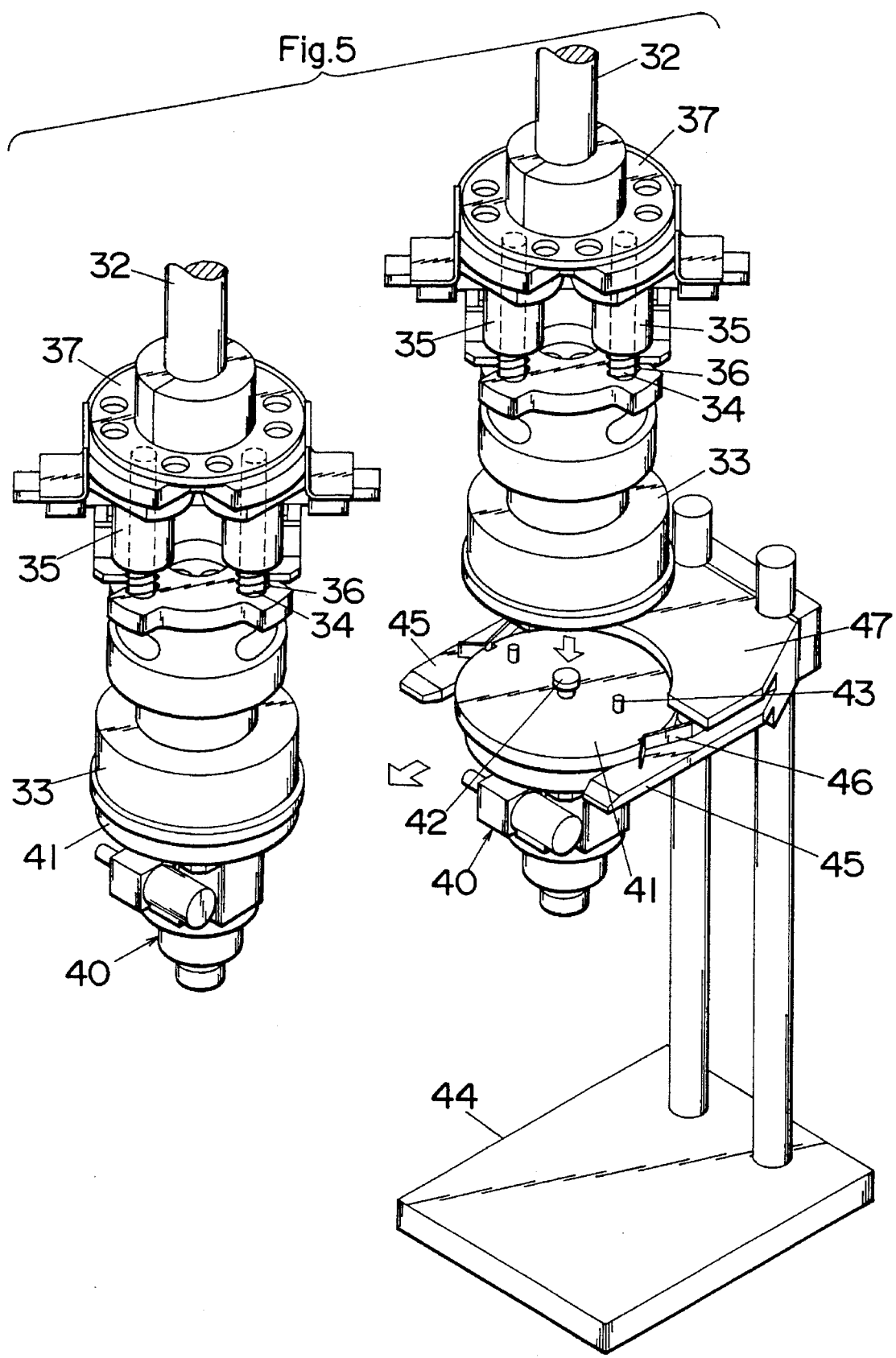

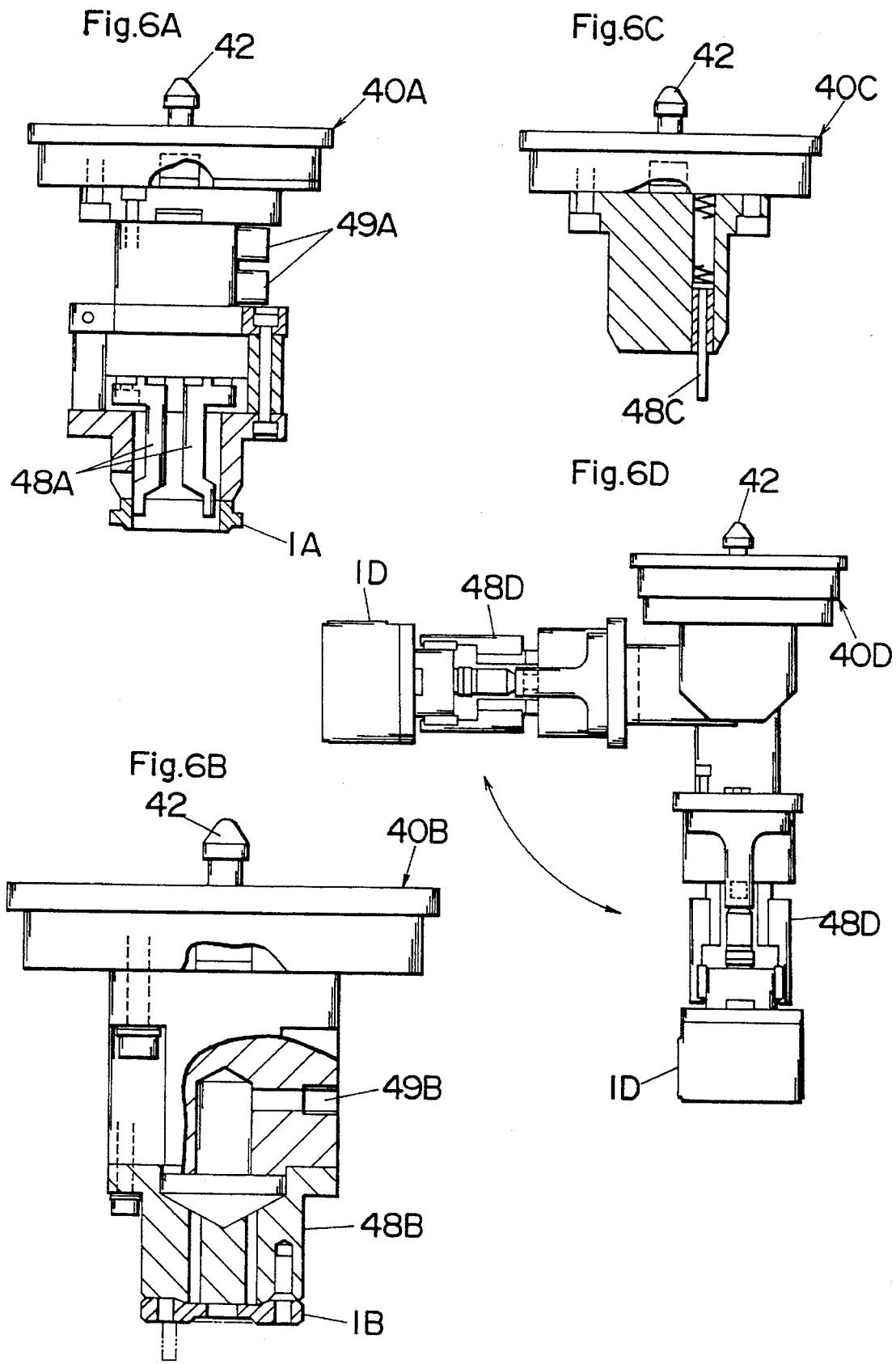

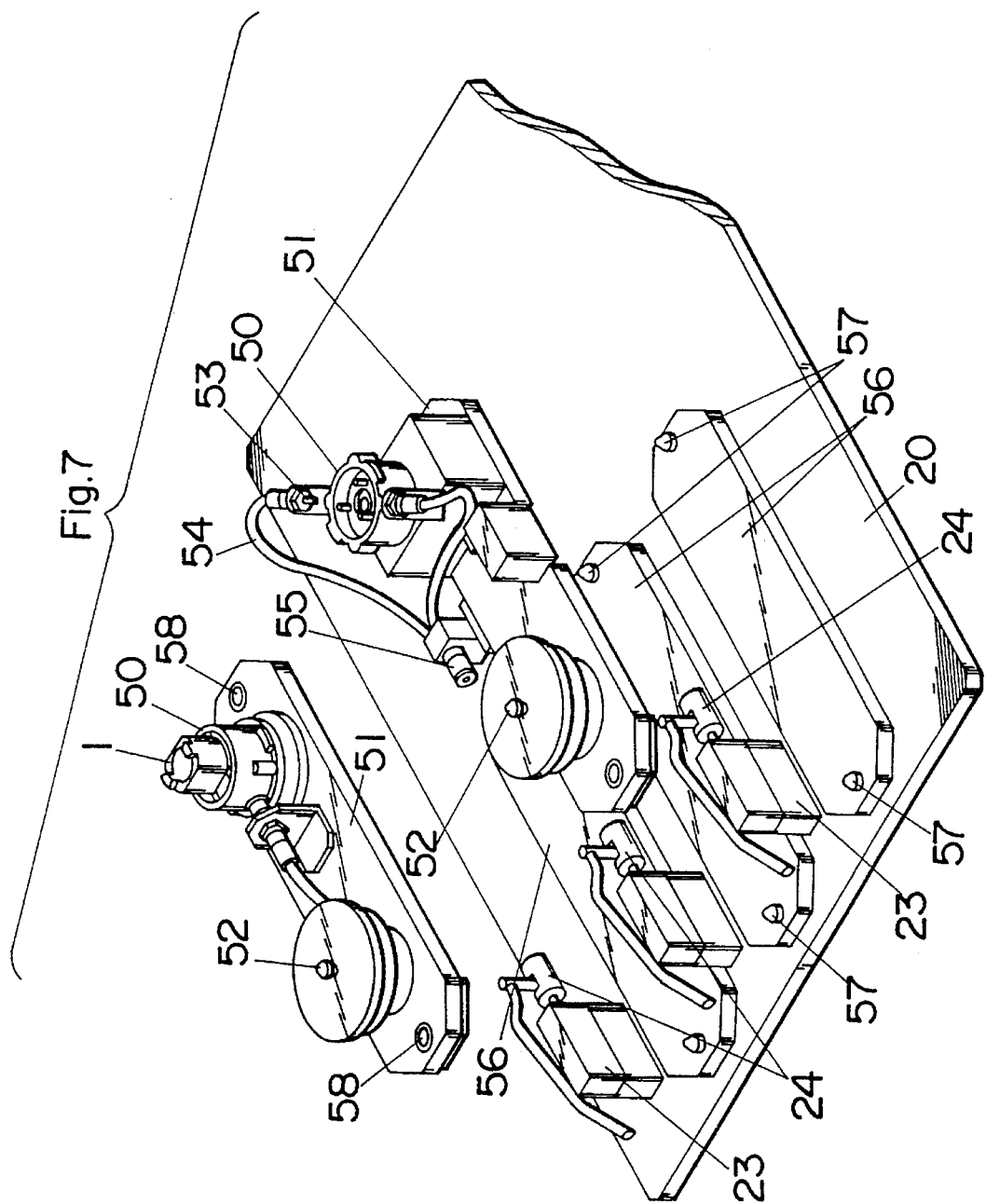

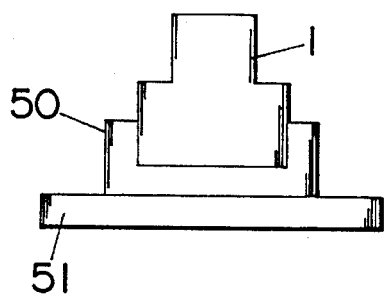
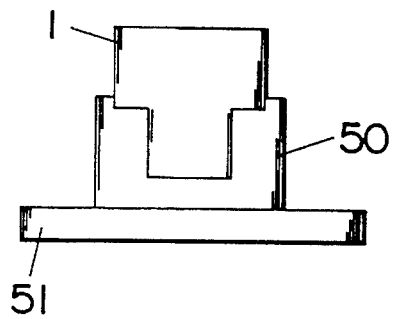
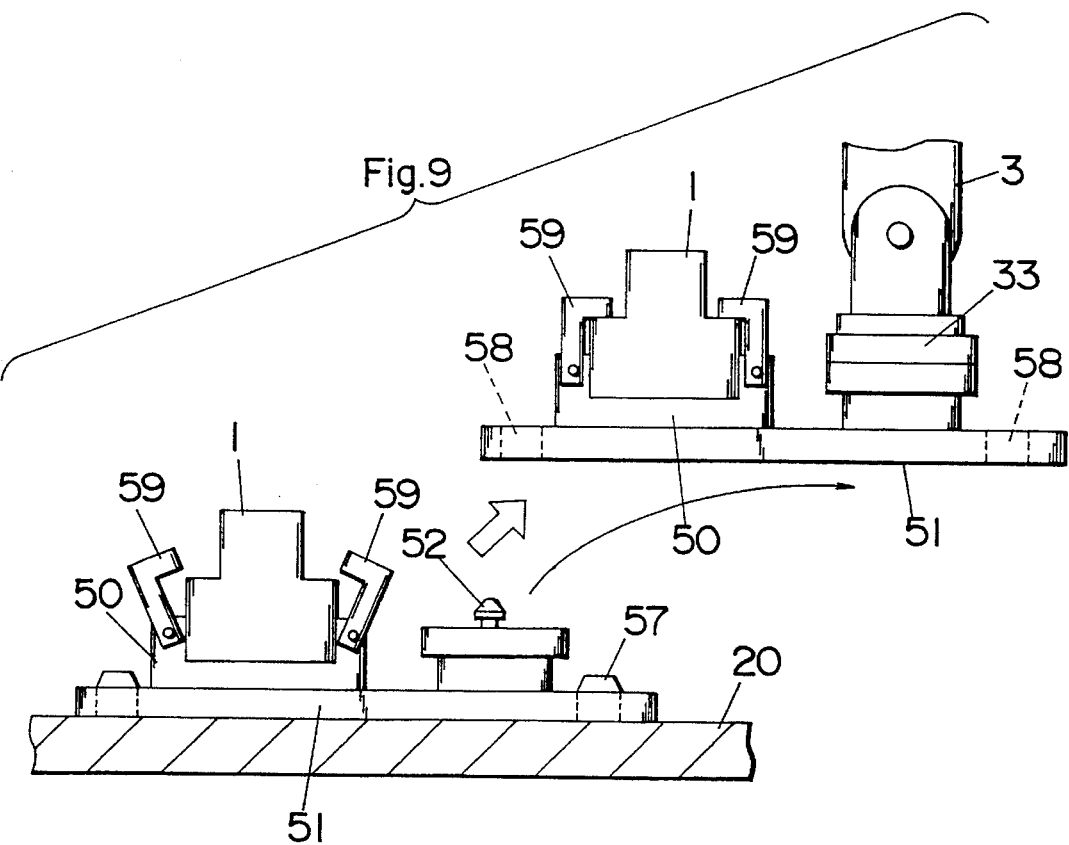

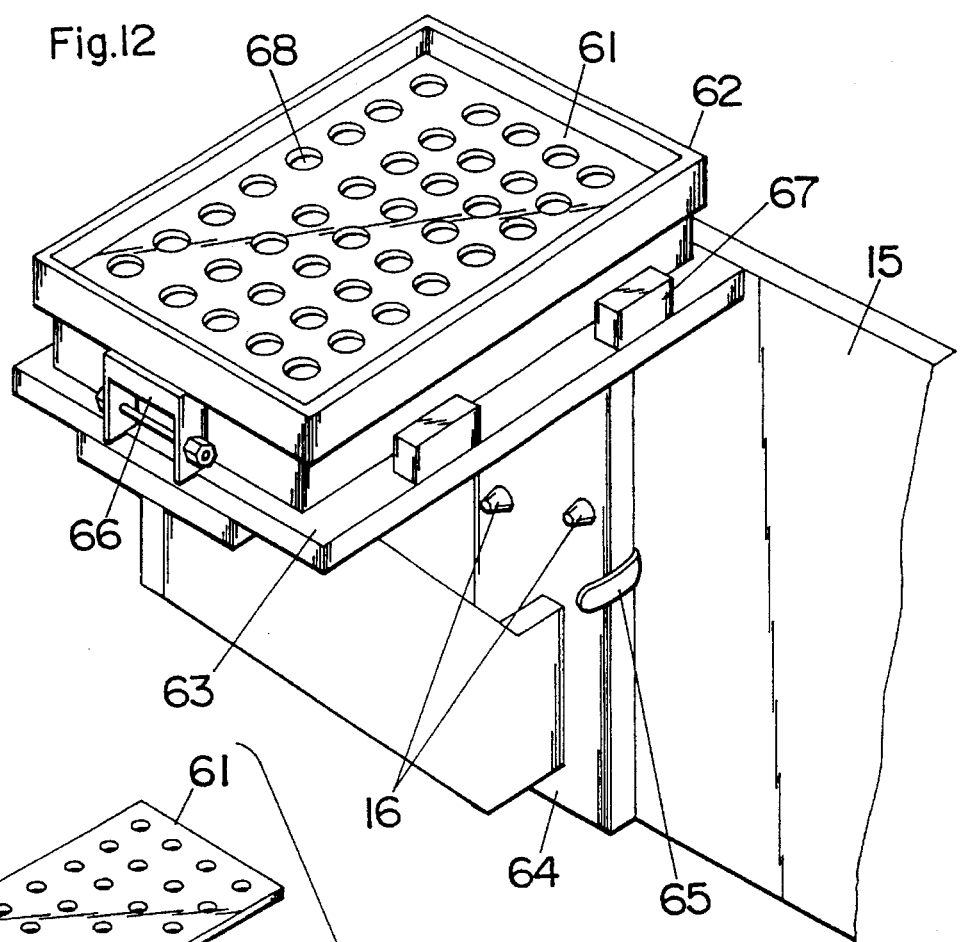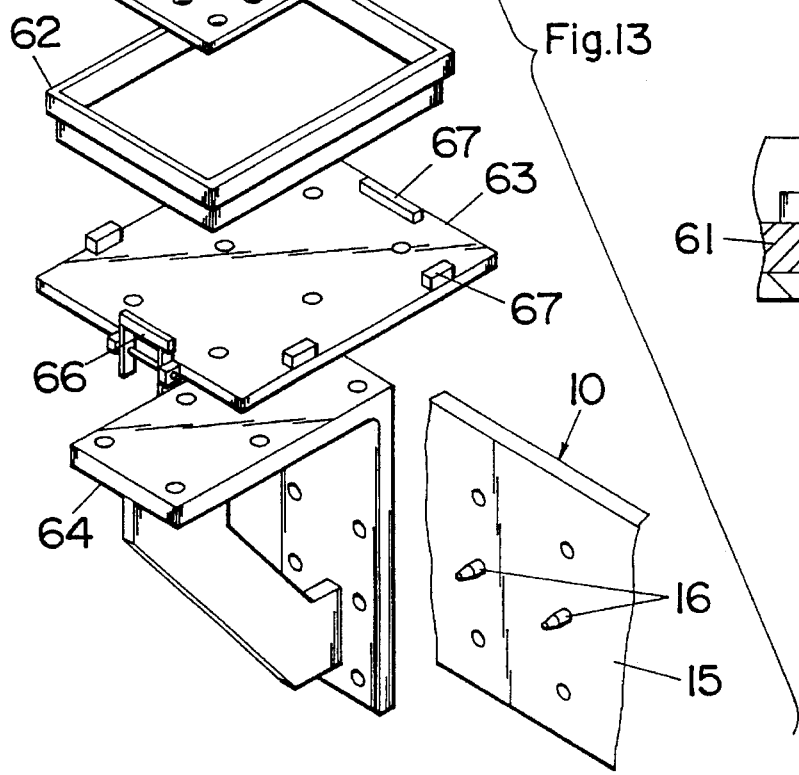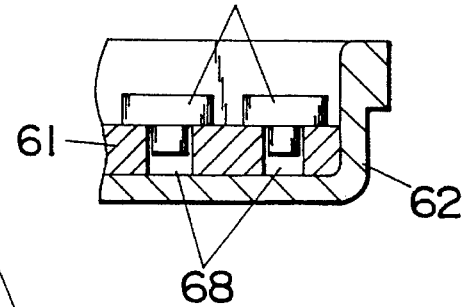

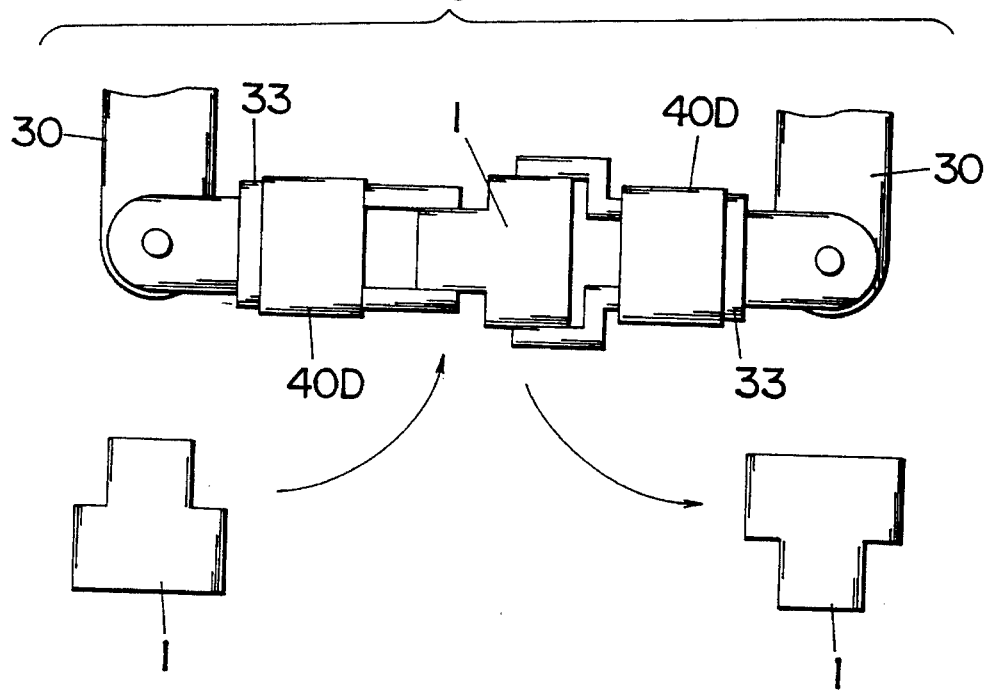
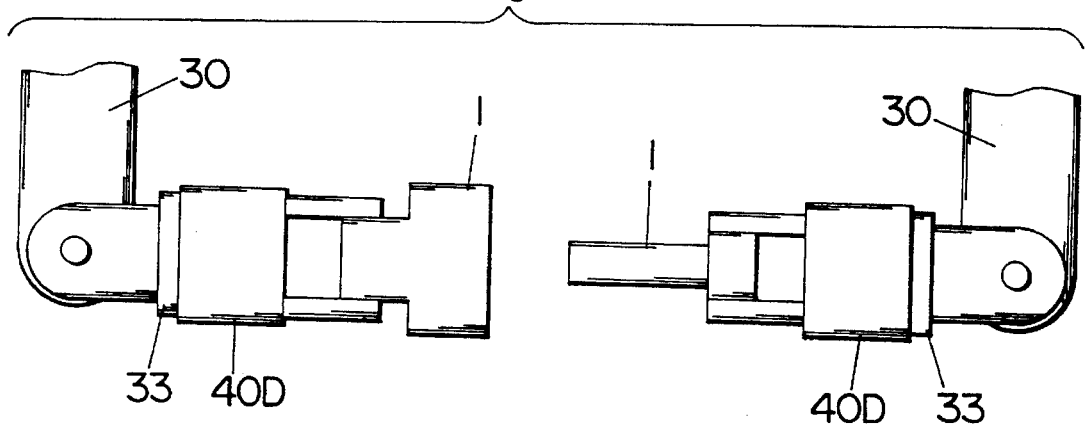

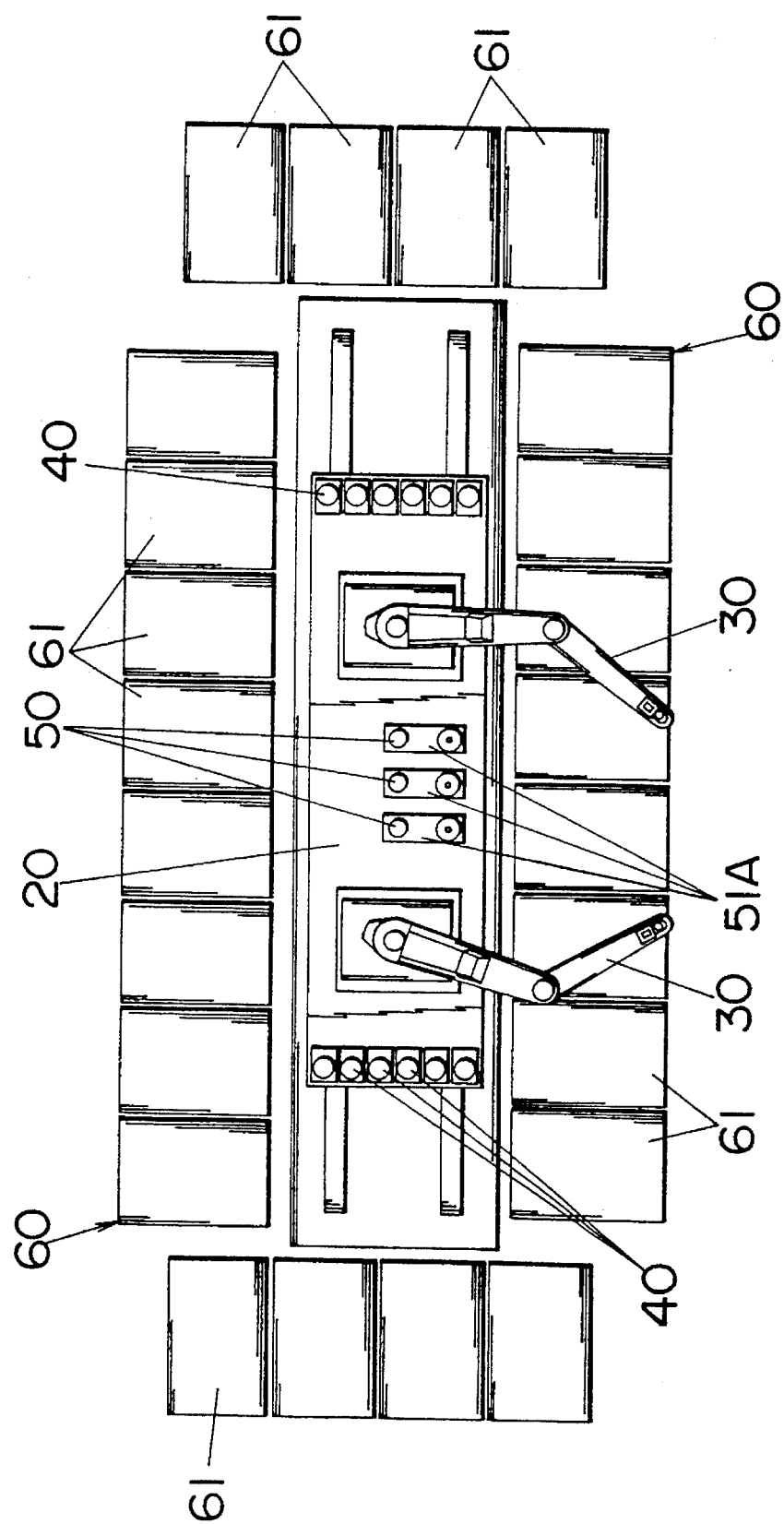

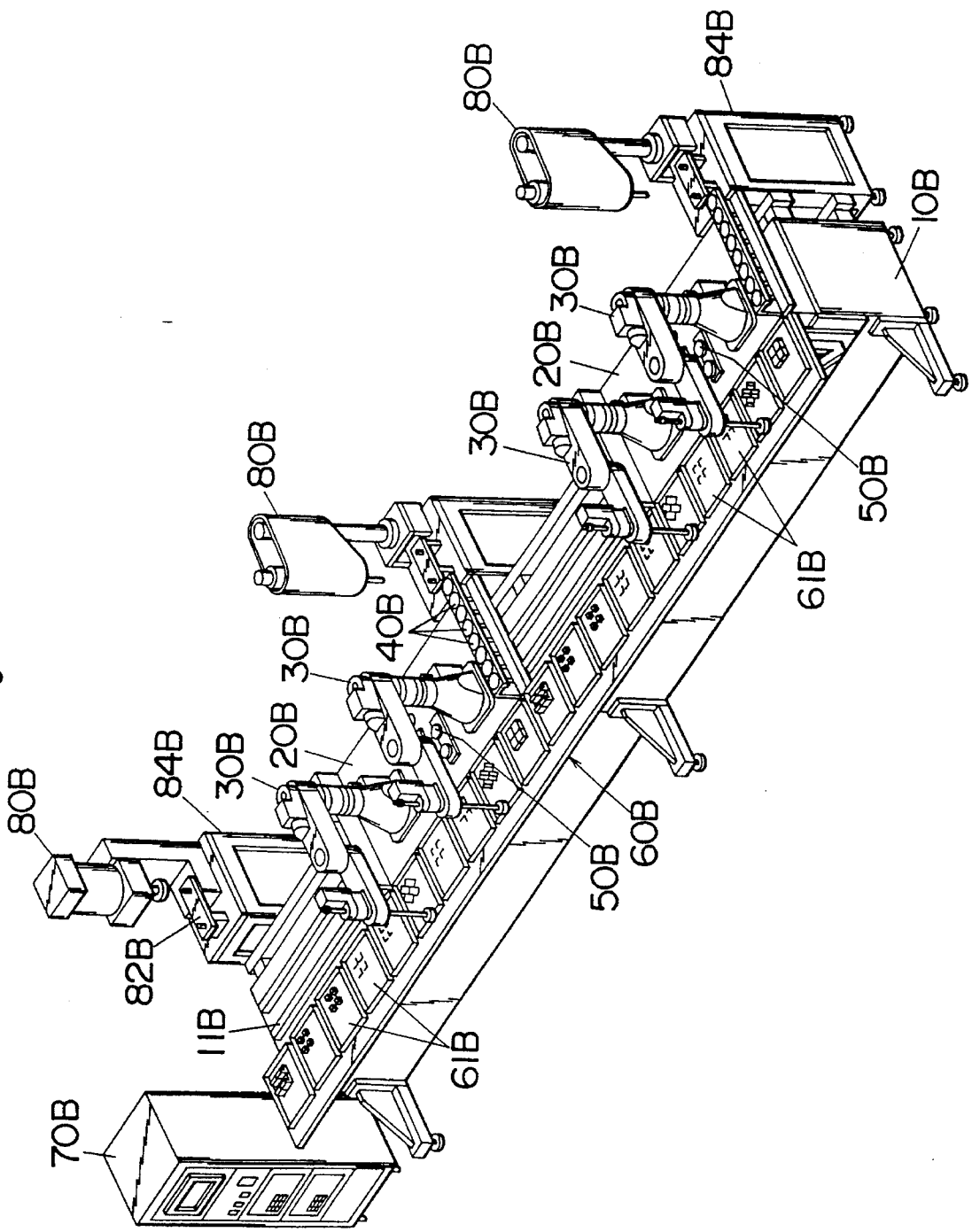

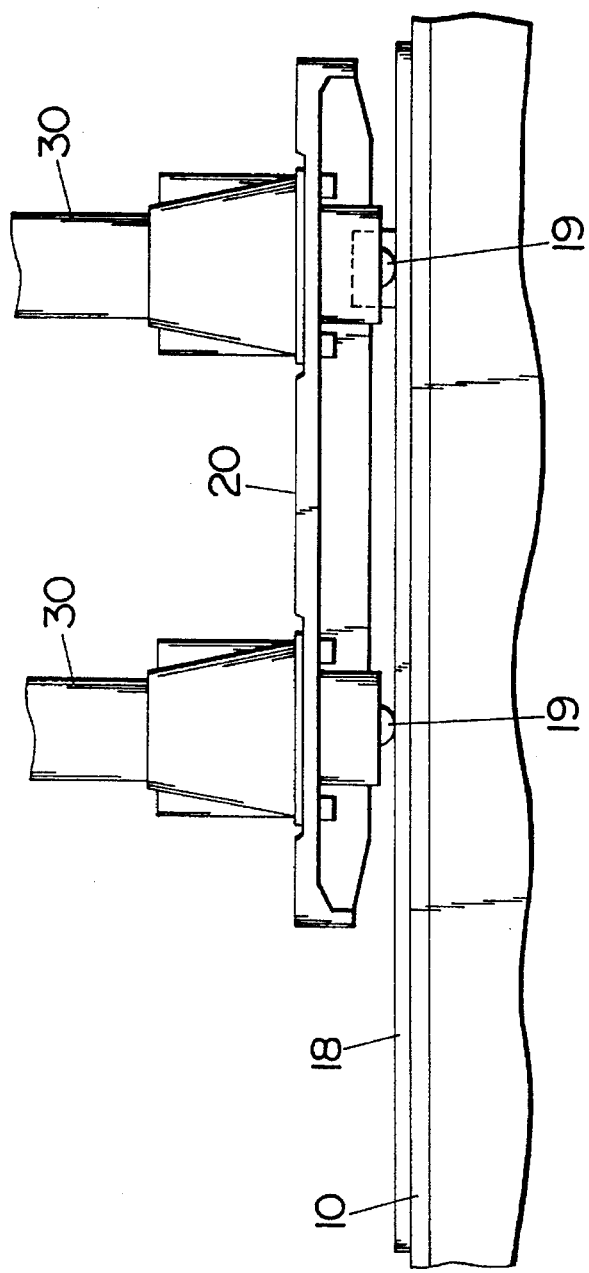
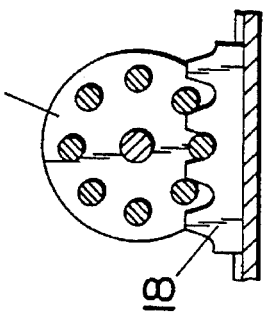
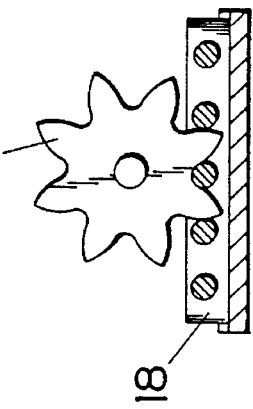
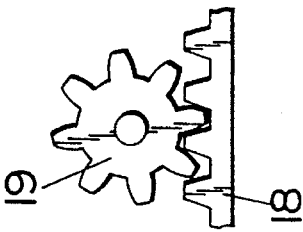

5,586,387

AUTOMATED PART ASSEMBLY MACHINE

BACKGROUND ART

1. Field of the Invention

The present invention is directed to an automated part assembly machine, and more particularly, to such a machine provided with at least two robots for assembly a product from a number of parts of different configurations.

2. Description of the Prior Art

Japanese Patent Early Publication (KOKAI) No. 4-223827 discloses a prior automated part assembly machine with a robot and a pair of operator hands selectively attached to the robot for effecting different operations in assembly parts held by a jig placed on a work table. The parts are stored in a pallet disposed adjacent the work table and are picked up by the operator hand attached to the robot and transferred to the jig on the work table for assembly thereat. The robot is supported on a base, while the work table is movable relative to the base and the pallet. That is, the jig on the work table is movable relative to the robot on the base so that the jig can move out of the reach of the robot for processing of the parts by a facility other than the robot.

SUMMARY OF THE INVENTION

The present invention provides an automated part assembly machine which adds enhanced and useful features to the prior machine. The automated part assembly machine in accordance with the present invention comprises a work table supported to a base and movable relative thereto and at least two separate robots each having an end effector movable around within an individual work region. The two robots are positioned in such a relation as to give a common work region in which the individual work regions of the two robots overlap. A parts supply is arranged to the work table for storing parts to be picked-up by the robots. A plurality of operator hands are selectively and removably attached to the end effector of the robot for handling the parts by the robot. Disposed within the common region is a jig which positions the parts for assembly by the robot. The robots and the work table are controlled to operate in cooperation for assembly of the parts. The machine is characterized in that the robots are mounted on the movable work table together with the operator hands and the jig with the robots spaced in the moving direction of the work table, and that the parts supply extends in the moving direction of the work table. Thus, the robots are enabled to move together with the jig and the operator hands relative to the parts supply so that the robots can reach over a wide range of the parts supply beyond the individual work regions to thereby successfully pick-up suitable parts and transfer them to the jig for immediate assembly of the parts. Further, since the operator hands are on the movable work table, the robot can change the operator hands while moving relative to the parts supply for effecting the part assembly substantially without interruption, in addition to the advantage of enabling one robot to change the operator hand while the other robot is handling the parts.

Accordingly, it is a primary object of the present invention to provide an automated part assembly machine which is capable of efficiently performing the assembly of the parts involving the pick-up of the parts and changing the operator hands.

The operator hands includes combination hands which enable the robots to handle one of the parts in cooperation with each other. With the use of the combination hands, the robots are easy to place the parts in the jig in cooperation with each other and also to alter the attitude of the parts during the handling thereof.

The jig includes a set of different holders each capable of retaining one of the parts at different attitudes. With the use of such holders the parts can be processed by the robot at different portions of the parts to enable complicated assembly of the parts.

Preferably, the jig is mounted on a base plate which is detachable to the work table so that the jig can be easily replaced by another jig as necessary. Particularly, when the parts are required to be processed by a facility other than the robot, the parts can be transferred to such facility as being held in the jig and be returned for immediate processing by the robot.

Further, the jig includes a catch by which it is detachably connected to the end effector of the robot so that the jig can be transferred out of the work table but within the work region of the robot for immediate processing of the parts by the facility other than the robot.

The jig also includes a latch which locks the part to a particular position on the jig when the jig is kept connected to the robot and which o releases the part when the jig rests on the work table.

In a preferred embodiment, the jig includes a shuttle jig which receives the part and is detachably connected to the end effector of the robot so that the part can be transferred by the robot as being received in the shuttle jig. The shuttle jig is utilized to transfer the part out of the work table to a portion of the above facility to support the part in processing by the facility, which eliminate the necessity of providing a jig on the side of the facility.

The machine is preferred to include a stand for receiving at least one of the operator hands. The stand is located within the common work region so that at least one of the operator hands is accessible from either of the robots.

The parts supply may carry additional operator hands and additional jig at a region commonly accessible from the robots so that the robots are enable to select the operator hand and the jig from an increased number of types.

The parts supply is preferably configured to surround the work table so that the robots can have an increased access range for picking up the parts.

The base may have an extension for extending a movable range of the work table so that the robots can have an increased chance of accessing the parts.

The machine may includes another work table carrying the robots, the jig, and the operator hands in the like manner as described in the above.

These and still other advantageous features will become more apparent from the following detailed description of the embodiments when taking in conjunction with the attached drawings.

BRIEF DESCRIPTION OF THE DRAWINGS

FIG. 4 is a plan view illustrating work region covered by individual robots of the machine;

FIG. 5 is a perspective view illustrating an operator hand shown respectively as detached from an end effector of the robot and attached thereto;

FIGS. 6A, 6B, 6C, and 6D illustrate different types of the operator hands, respectively;

FIG. 7 is a perspective view illustrating jigs detachably mounted on a work table of the machine;

FIGS. 8A and 8B illustrates different types of the jigs utilized in the machine for holding a part at different orientations;

FIG. 9 illustrates another jig utilized in the machine and shown in positions of releasing the part and holding the part, respectively;

FIG. 12 is a perspective view of a parts supply utilized in the machine;

FIG. 13 is an exploded perspective view of the above parts supply;

FIG. 14 is a partial sectional view of the parts supply;

FIG. 17 illustrates a particular operator hands designed for transferring a part from one robot to the other while reversing the orientation of the part;

FIG. 18 illustrate a manner in which the two robots are cooperative to combine parts with one part held by one operator hand and with the other part held by the other operator hand;

FIG. 21 is a plan view illustrating a like part assembly machine in accordance with a modification of the above embodiment;

FIG. 22 is an automated part assembly machine in accordance with a second embodiment of the present invention;

FIG. 23 illustrates a modified structure of movably supporting the work table on the base;

FIG. 24 illustrates a rack-and-pinion mechanism utilized in the structure of FIG. 23;

FIGS. 25 and 26 illustrate a modified rack-and-pinion mechanism which may be utilized in the structure of FIG. 23;

DETAILED DESCRIPTION OF THE EMBODIMENTS

Figure 1:
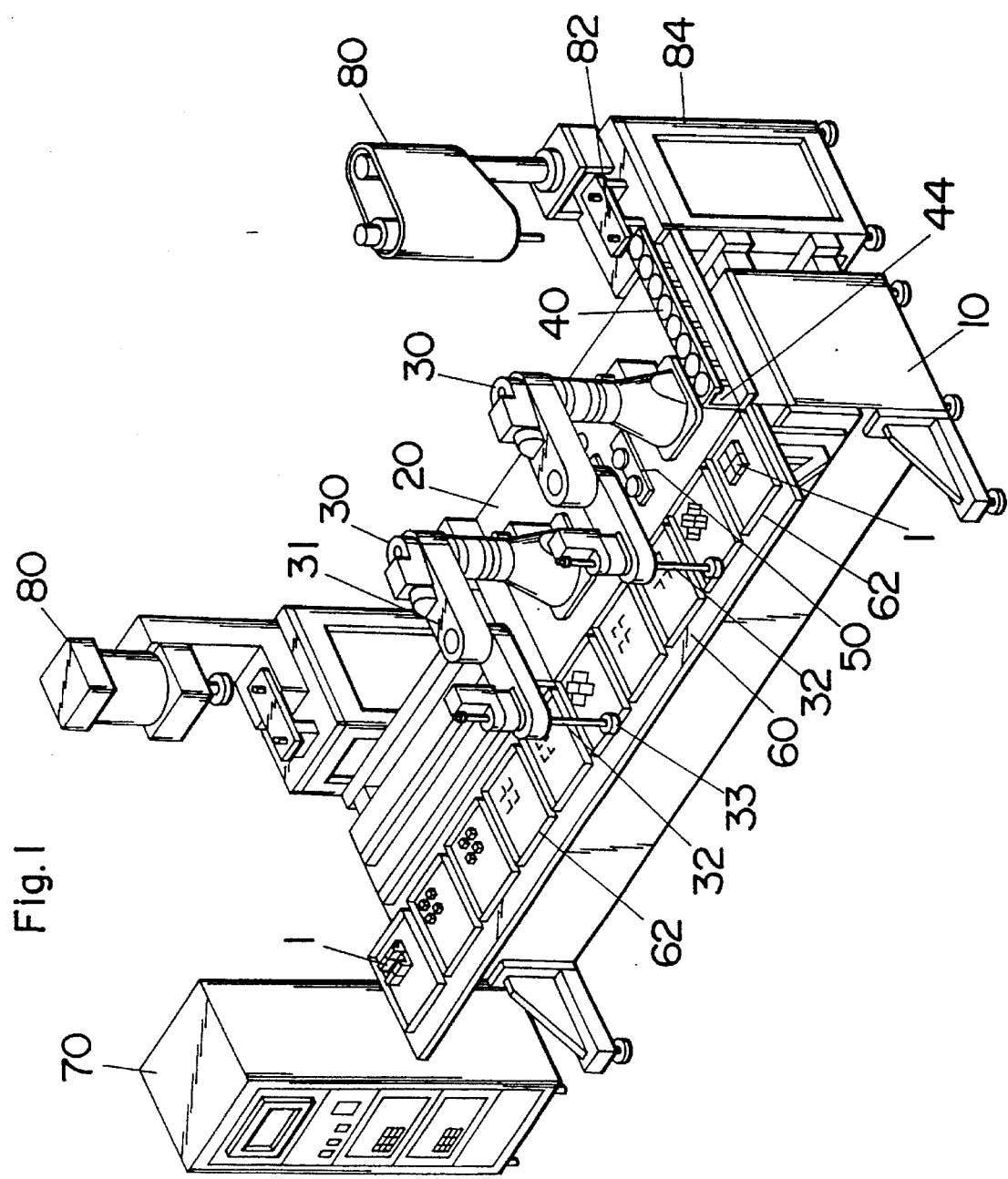
FIG. 1 is a perspective view of an automated part assembly machine in accordance with a first embodiment of the present invention.
Figure 2:
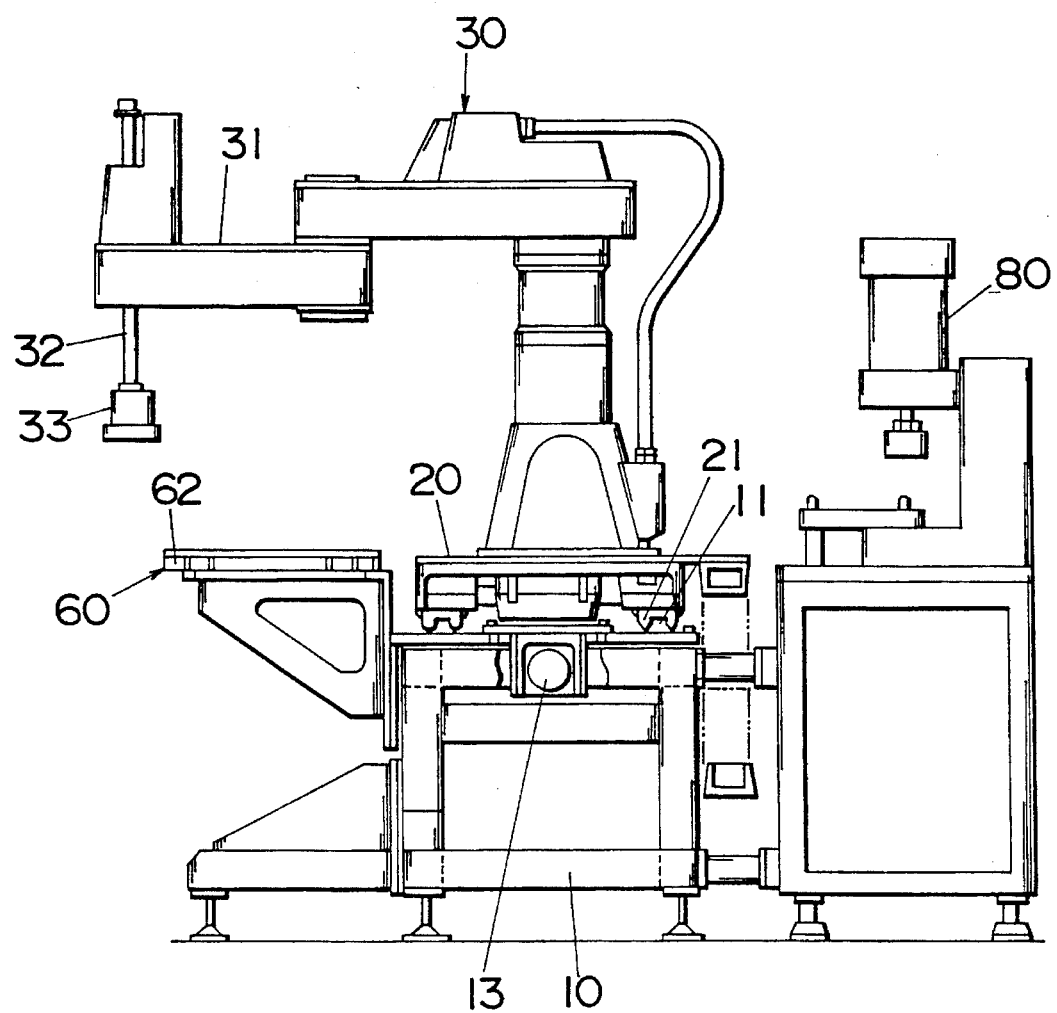
FIG. 2 is a side view of the machine.
Figure 3:
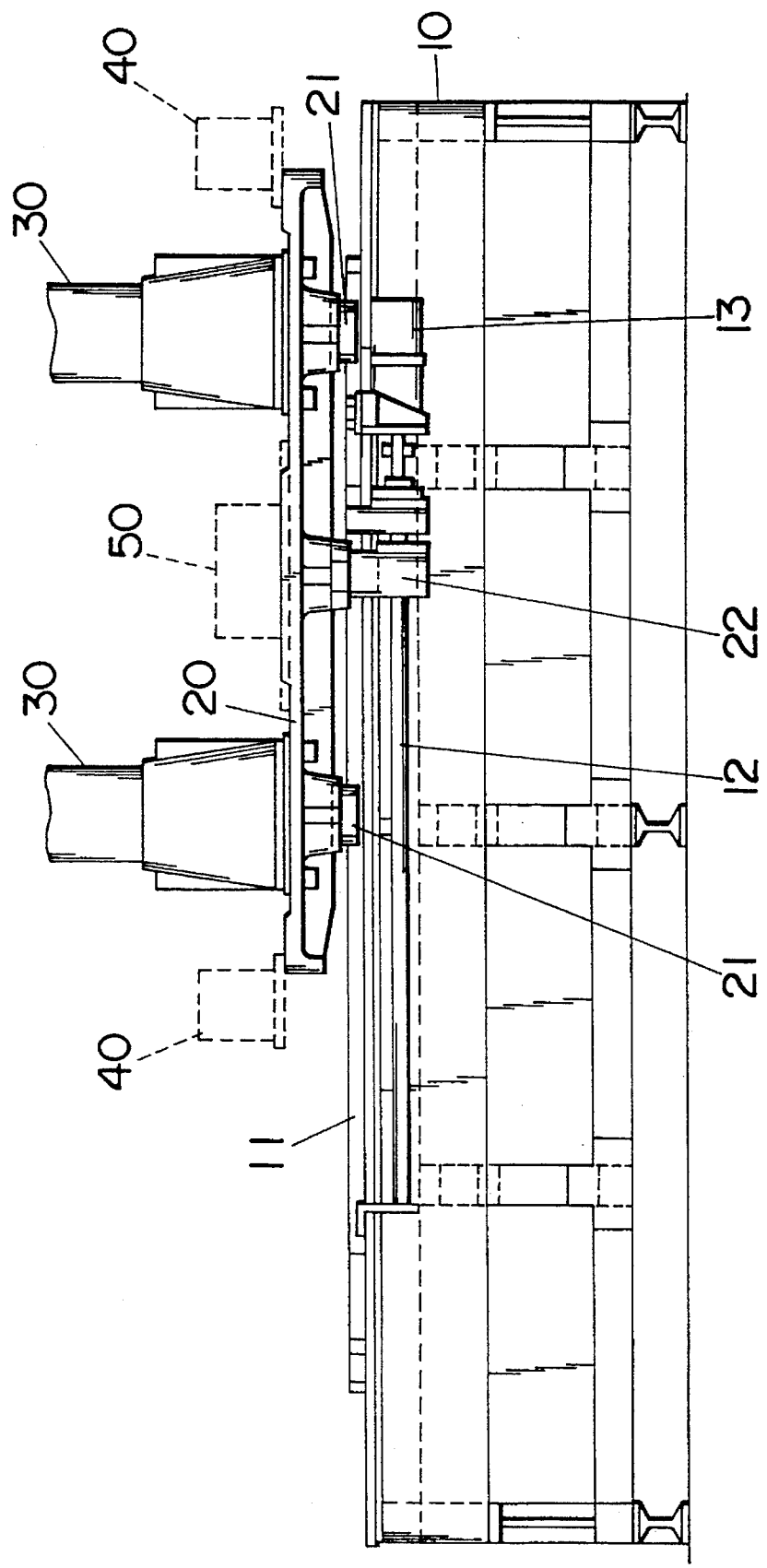
FIG. 3 is a partial front view of the machine.

Referring to FIGS. 1 to 3, there is shown an automated part assembly machine in accordance with a first embodiment of the present invention. The machine comprises a base 10 supporting thereon a rectangular work table 20 horizontally movable along a lengthwise direction thereof. A pair of robots 30 are mounted on the work table 20 in a spaced relation along the lengthwise direction thereof for assembling parts 1 selected from a number of parts of different configurations. Each robot 30 has four degrees of freedom with a horizontally articulated arm 31. Carried at the free end of the arm is a vertically extending end effector 32 with a self-locking chuck 33 for detachably gripping an operator hand 40 for handling the part 1. Plural kinds of the operator hands 40 are prepared in correspondence to the parts of different configurations, and arranged on the work table 20 so that the robot can select a suitable one of the operator hands 40 depending upon the type of the parts to be handled. The machine also includes a parts supply station 60 disposed along the length of the base 10 and carrying a plurality of pallets 61 each storing the parts 1 of the same configuration. The part picked-up by the operator hand 40 is transferred to a jig 50 positioned on the work table 20 where it is held for assembly with another part. Also included in the machine are specific work facilities 80 disposed adjacent the opposite ends of the base 10 for effecting a specific work, for example, screw-tightening and press-fining of particular parts which is not expected by the robots 30. Installed adjacent the base 10 is a control center 70 which is connected to control the operations of the robots 30 and the specific work facilities 80, as well as the movement of the work table 20.

As shown in FIGS. 2 and 3, the work table 20 is provided on its bottom with sliders 21 which are in sliding engagement with rails 11 on top of the base 10. The base 10 has a feed screw 12 which is driven to rotate by an electric motor 13 fixed to the base 10 and which engages with a nut 22 on the bottom of the work table 20 for moving the work table 20 horizontally in the lengthwise direction of the base 10. As shown in FIG. 4, the two robots 30 are spaced along the moving direction of the work table 20 in such a manner as to have a common work region R, which is an overlap between individual work regions R1 and R2 within which the individual robots 30 can reach. It is within this common work region R that a set of jigs 50 is placed to be equally accessible from either of the robots 30, as best shown in FIG. 4. While, on the other hand, two sets of the operators hands 40 are disposed within the individual work regions R1 and R2 on opposite of the jigs 50 to be accessible only by the adjacent robots. As shown from the figure, the work regions R1 and R2 extend over a portion of the parts supply station 60 such that the robots 30 when moving with the work table 20 can reach over substantially entire area of the parts supply station 60 for picking up any desired parts 1 from within the pallets 61 arranged along the moving direction of the work table 20.

As shown in FIG. 5, the self-locking chuck 33 for detachably gripping the operator hand 40 is attached to the lower end of the end effector 32 so as to be vertically movable thereto within a limited extent. To this end, the chuck 33 is formed with a set of vertical journals 34 which extend through corresponding bearings 35 secured at the lower end of the end effector 32. The chuck 33 is biased downwardly by means of springs 36 fitted around the journals 34 between the bearings 35 and the chuck 33. The upper ends of the journals 34 are fixed to a stopper 37 which rests upon the bearings 35 for limiting the downward movement of the chuck 33. The chuck 33 fastens and unfastens a knob 42 on the center of a top disc 41 of the operator hand 40 by the action of a compressed air supplied to the chuck 33. A pair of positioning studs 43 projecting on top of the operator hand 40 are received in corresponding holes (not seen) in the chuck 33 for correct positioning of the operator hand 40 relative to the chuck 33. When out of use, the operator hand 40 is held by a rack 44 on the opposite ends of the work table 20. The rack 44 includes a pair of legs 45 engaging the periphery of the disc 41 of the operator hand 40. The rack 44 also includes a pair of leaf springs 46 which come into a pressed contact with the disc 41 for firm retention of the operator hand 40. Further, the rack 44 has a flap 47 which is place over a portion of the disc 41 to prevent an accidental escape of the operator hand 40. Attachment of the operator hand 40 to the robot 30 is made by firstly descending the chuck 33, as indicated by an arrow in FIG. 5, and gripping the knob 42 followed by moving the end effector 32 horizontally away from the rack 44, as indicated by another arrow in the figure. Detachment of the operator hand 40 is made in the reverse procedure.

FIGS. 6A to 6D illustrates several types of the operator hands 40 designed for handling the particular types of the parts. The operator hand 40A shown in FIG. 6A is of the type having a set of expansion jaws 48A which opens and closes by the action of a compressed air supplied through ports 49A for handling the part 1A. The operator hand 40B shown in FIG. 6B is of the type having a suction head 48B for sucking the part 1B by the action of decreased pressure resulting from a vacuum source connected through a vacuum port 49B. The operator hand 40C shown in FIG. 6C is of the type having a downwardly biased pin 48C for precise correction of the position of the part. The operator hand 40D shown in FIG. 6D is of the type capable of swiveling within an angular range of 90° and having a grip 48D for holding the part 1D so as to orient the parts horizontally and vertically. With this operator hand 40D, the two adjacent robots 30 can be cooperative to transfer the part from one to the other or to combine the parts in the air above the jig 50. The ports 49A and 49B of the operator hands 40A and 40B may be coupled through correspondingly formed portions in the chuck 33 of the robot 30 to a source of compressed air or vacuum, or through separate hoses or the like. Each of the above operator hands may be driven by an incorporated electric motor. Likewise, the chuck 33 may be driven by an electric motor to grip and release the operator hand.

As shown in FIG. 7, each of the jigs 50 of different types is mounted on a base plate 51 and is transferred by the robot 30 together with the base plate 51 between the common region and outside thereof for the purpose of enabling the specific work at the specific work facility 80. To this end, the base plate 51 is provided with a catch 52 detachable to the chuck 33 of the robot 30 in the manner as the knob 42 of the operator hand 40 is connected to the robot 30. The jig 50 is configured to receive the corresponding part in the fixed orientation and has a latch 53 for locking the part in an exact position. For example, the part 1 is supported in an erected position of FIG. 8A by the use of the jig 50 of one type and in an inverted position of FIG. 8B by the use of the jig 50 of another type. The latch 53 is actuated by an electromagnetically driven valve (not shown) to lock the part by the action of a compressed air supplied through a tube 54 and to release or slacken the part by escaping the compressed air. The tube 54 has a plug 55 detachable to a socket 24 which is movable by means of a cylinder 23 fixed on the work table 20. A footplate 56 is secured on the work table 20 for detachably mounting the base plate 51 by engagement of tapered studs 57 into corresponding holes 58 in the opposite ends of the base plate 51. FIG. 9 illustrates a jig 50 with clamps 59 which hold the part 1 in position when the jig 50 is being transferred by the robot 30.

Figure 10A:
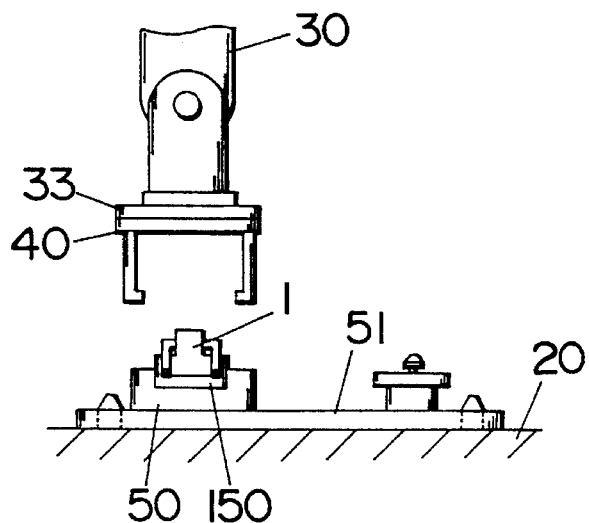
FIGS. 10A, 10B, and 10C illustrate a further jig utilized in the machine and having a shuttle jig shown in different positions of being released from the robot, gripped by the robot, and transferred by the robot, respectively.
Figure 10B:
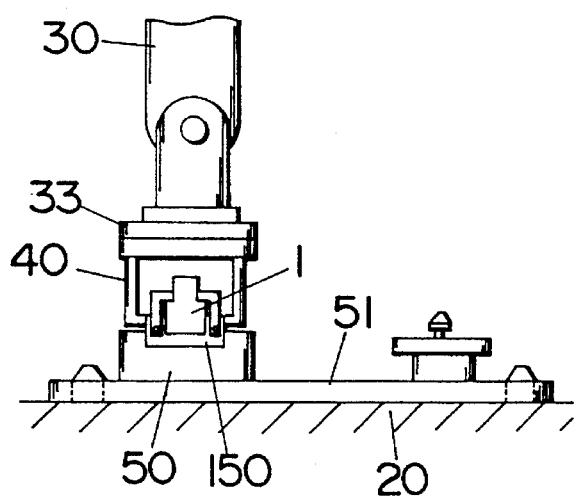
Figure 10C:
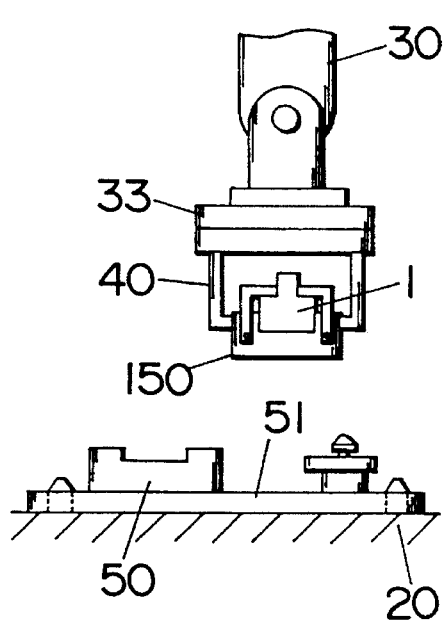

As shown in FIGS. 10A to 10C, the jig 50 may be additionally provided with a shuttle jig 150 which receives the part therein and is debatable to the jig 50 on the base plate 51. The shuttle jig 150 is configured to be handled by a corresponding operator hand 40 so as to transfer the part 1 between the common work region and the specific work facility 80 for effecting the specific work thereat. With the use of the shuttle jig 150, it is readily possible to reduce space requirement on the side of the specific work facility 80. The shuttle jig 150 may be provided with a like catch so as to be detachably to the chuck of the operator hand 40.

Figure 11:
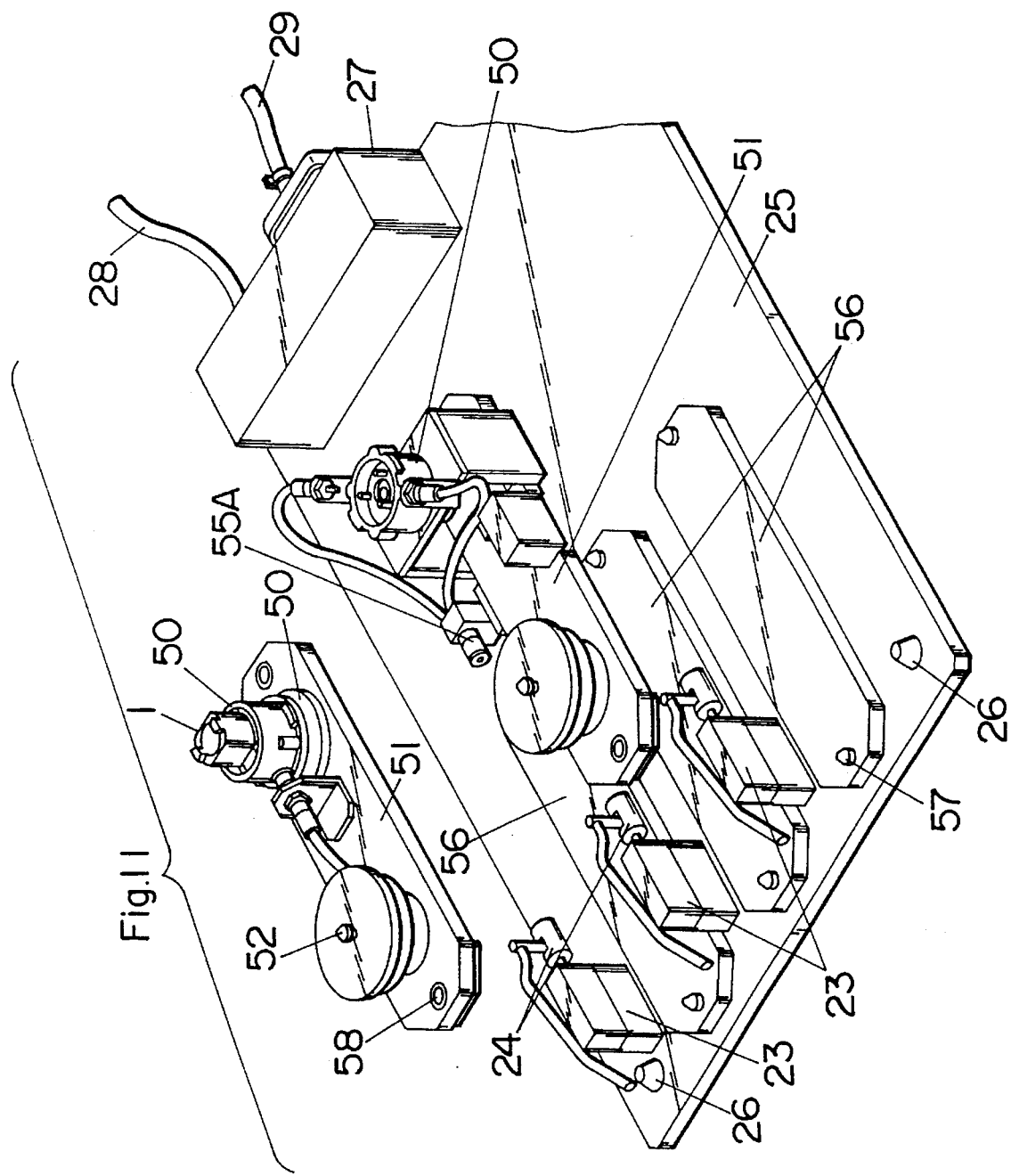
FIG. 11 is a perspective view illustrating further modified jigs utilized in the machine.

As shown in FIG. 11, the work table 20 may be provided with a detachable platform 25 which carries the plural footplates 56 each mounting the base plate 51 of the jig 50. In this instance, the platform 25 is held in position on the work table 20 by engagement of tapered studs 26 on the work table 20 into corresponding holes in the platform 25. The platform 25 is formed with a box 27 incorporating a distributor (not shown) for distributing the compressed air supplied through a tube 28 to the plug 55A on the platform 25 as well as electronic devices (not shown) for actuating the cylinders 23 to connect and disconnect the plug 55A to and from the socket 24. An electric cable 29 is connected to the box for controlling and monitoring the operations of the jigs 50. The platform 25 can be readily replaced by another platform carrying different kinds of jigs 50 so as to increase flexibility in assembling the parts of different kinds.

The structure of the parts supply station 60 is now explained with reference to FIGS. 12 and 13. Each pallet 61 holding the parts 1 is received in a tray 62 mounted on a shelf 63 which is secured to the base 10 by means of an angled frame 64. The frame 64 is positioned on a side wall 15 of the base 10 by engagement of tapered pins 16 into corresponding holes in the frame 64 and is secured by means of a clamp lever 65. The tray 62 is kept in position on the shelf 63 by means of a hook 66 in combination with blocks 67 formed on the shelf 63. The pallet 61 is formed with a plurality of sockets 68 to store the parts 1 therein, as shown in FIG. 14.

Figure 15:
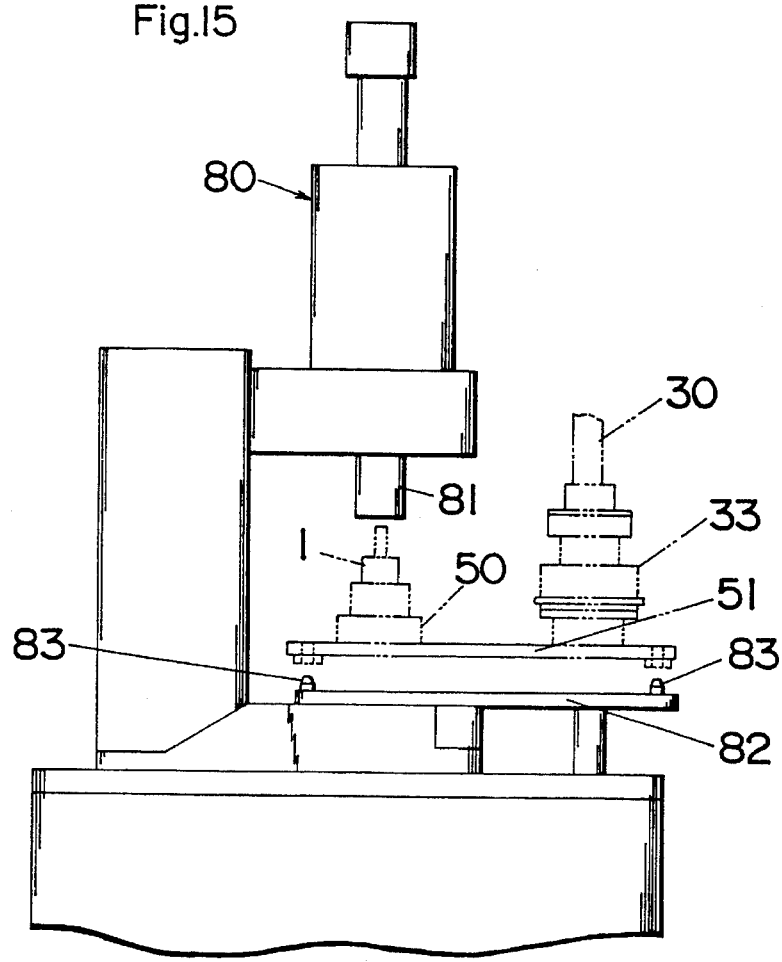
FIG. 15 is a side view illustrating a specific work facility utilized in the machine.
Figure 16:
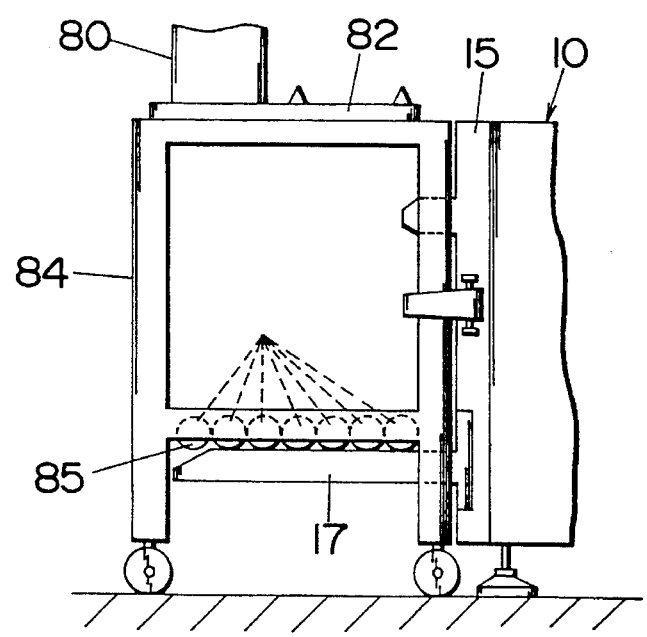
FIG. 16 is a schematic view illustrating a connection between the parts supply and a base of the machine.

As shown in FIG. 15, the specific work facility 80 includes a device, for example, a press 81 for pressing one part into the other part held on the jig 50. The jig 50 is transferred together with the base plate 51 from the common work region R to a counter 82 of the facility 80 by the robot 30. The counter 82 is of the same configuration as the footplate 56 on the work table 20 to detachably retain the base plate 51 and therefore the jig 50 with the parts 1 in position by engagement of tapered pins 83 into corresponding holes in the base plate 51. When the shuttle jig 150 is utilized to transfer the parts between the common work region R and the facility 80 by the use of the suitable operator hand 40, the facility 80 is formed with a particular station for detachably receiving the shuttle jig 150. As shown in FIG. 16, the facility 80 is carried on a wagon 84 which is detachable to the side wall 15 of the base 10 opposite of the parts supply station 60 in the same manner as the parts supply station 60. In order to easily and exactly connecting the facility 80 to the base 10, the wagon 84 carries a plurality of rollers 85 which comes into rolling contact with a beam 17 projecting from the base 10 and having an inclined guide end.

Since the jigs 50 are disposed in the common work region R where they are equally accessible by the two robots 30, a parallel processing can be made in which one robot 30 effects placement of the part in the jig 50 while the other robot 30 is in operation to replace the operator hand 40 or to handle the other part 1 in association with the movement of the work table 20. Particularly since the pallets 61 for the parts are arranged along the moving direction of the work table 20, either of the robots 30 can access over a wide range of the parts for facilitating the part assembly. Further, it is possible for the one robot to continue handling the parts while the other robot is in operation to transfer the parts for processing by the specific work facility 80. When using the operator hands 40D as explained with reference to FIG. 6D, it is possible that the part 1 is handed over from the one robot 30 to the other robot while reversing the attitude or orientation of the part, as shown in FIG. 17, or that the parts 1 are assembled together with the parts held respectively by the robots 30, as shown in FIG. 18.

Figure 19:
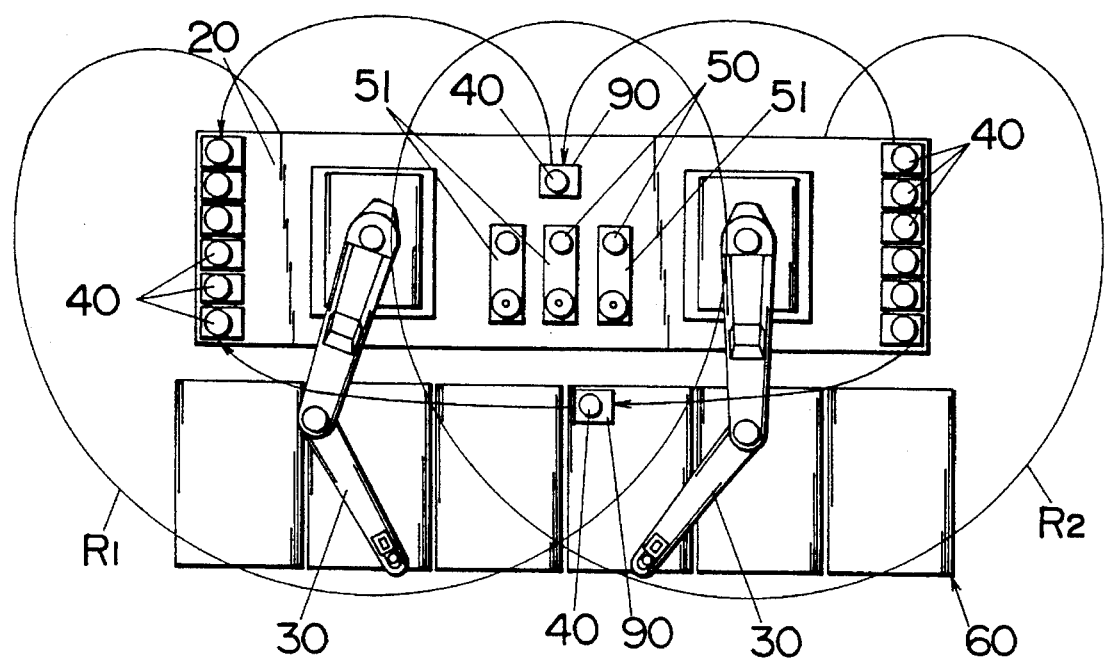
FIG. 19 is a plan view illustrating the operation of the robot arm in cooperation with stands mounting the operator hands.
Figure 20:
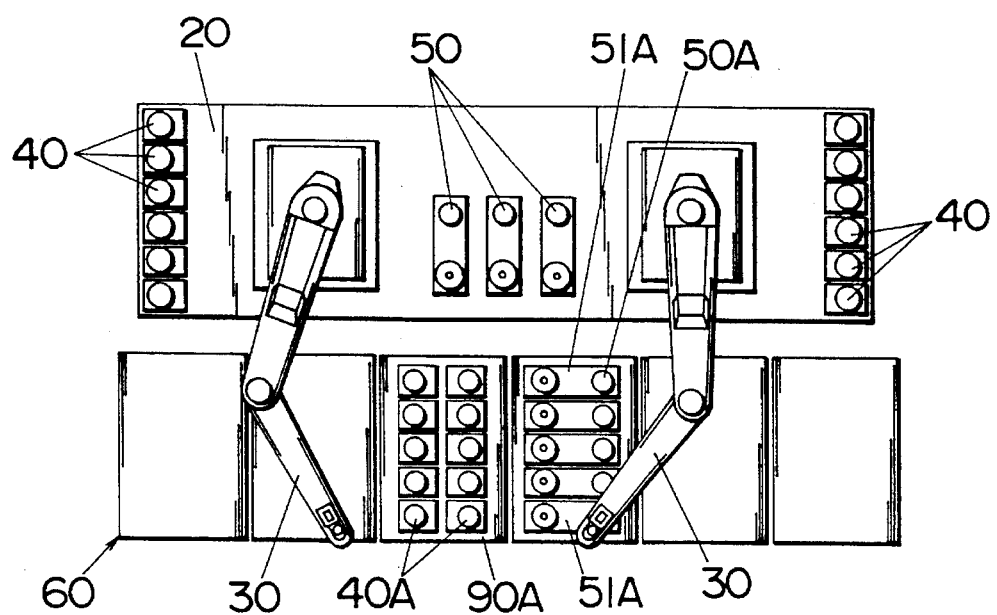
FIG. 20 is a plan view illustrating additional jigs and operator hands disposed in the parts supply.

As shown in FIG. 19, when a stand 90 for the operator hands 40 is disposed on the work table 20 and/or on the parts supply station 60 within the common work region R, all the operator hands 40 can be temporarily transferred to the stand 90 so that either of the robots 30 can equally utilize the operator hands 40 which are special to the individual robots. Further, as shown in FIG. 20, when additional operator hands 40A and jigs 50A are disposed on the parts supply station 60 together with the associated stands 90A and the base plate 51A, the robots 30 have an increased flexibility in handling a wide variety of parts by suitably taking the operator hands and the jigs from the parts supply station 60 onto the work table 20. The parts supply station 60 can be arranged in such a manner as to surround the base 10, as shown in FIG. 21, in order that the robots 30 can have an increased capability of accessing a wide variety of the parts on the station 60.

FIG. 22 illustrates an automated part assembly machine in accordance with a second embodiment which combines a pair of movable work tables 20B spaced in the moving direction thereof, and three specific work facilities 80B disposed at the opposite ends and center of an elongate base 10B on which the work tables 20B are a mounted. Each of the work table 20B is driven to move by means of a like drive mechanism having like rails 11B, feed screw and nut, as utilized in the previous embodiment. Each work table 20B has a pair of robots 30B of the same configuration as in the previous embodiment. The work table 20B carries the jigs 50B and the operator hands 40B as in the previous embodiment. A like parts supply stations extends over substantially the full length of the base 10B to be accessible by the robots 30B. In this embodiment, the facility 80B at the center of the base 10B is available commonly by the robots 30B at one end of either of the work tables 20B, in addition to that the robots at one end of either of the work tables 20B can be controlled to operate in cooperation for transferring the parts, operator hands, and the jigs from one work table to the other work table to effect multi-processing of the parts continuously. Like parts are designated by like numerals as in the previous embodiment with a suffix letter of B .

FIGS. 23 and 24 illustrate an alternate drive mechanism to be utilized in the present invention for moving the work table 20 on the base 10. The mechanism comprises a rack 18 on the base 10 and a pinion 19 at the bottom of the work table 20. The; pinion 19 is driven by an electric motor also carried on the work table 20. With the use of the rack-and-pinion mechanism, the work table 20 is readily adapted to move over an extended length presented by providing an additional rack to the base 10, in addition to that the two work tables 20B in the embodiment of FIG. 22 can be move together to one longitudinal end of the base 10B. The rack-and-pinion may be configured as shown in FIG. 25 or shown in FIG. 26.

Figure 27:
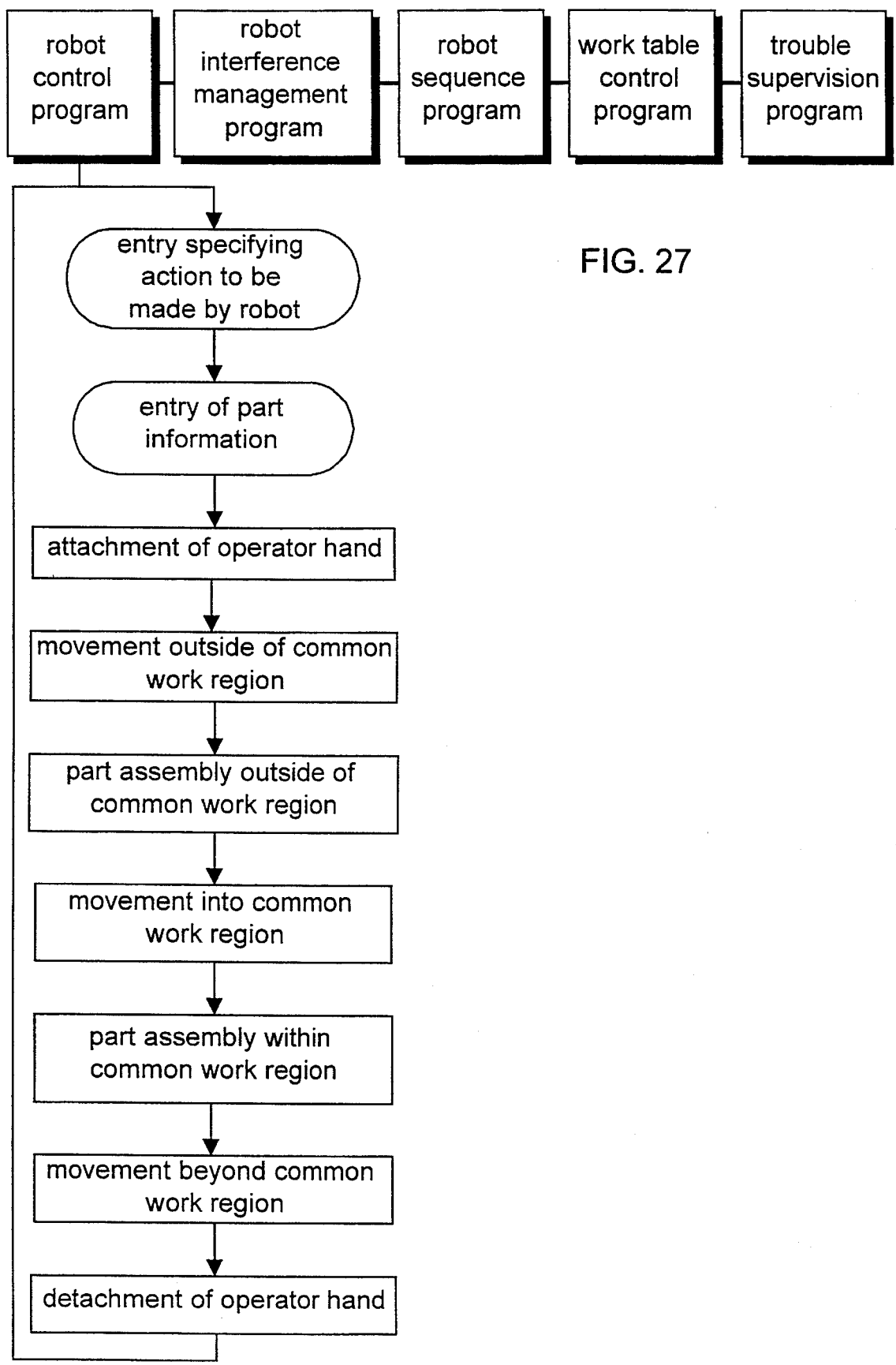
FIG. 27 is a chart illustrating a control program of the machine.
Figure 28:
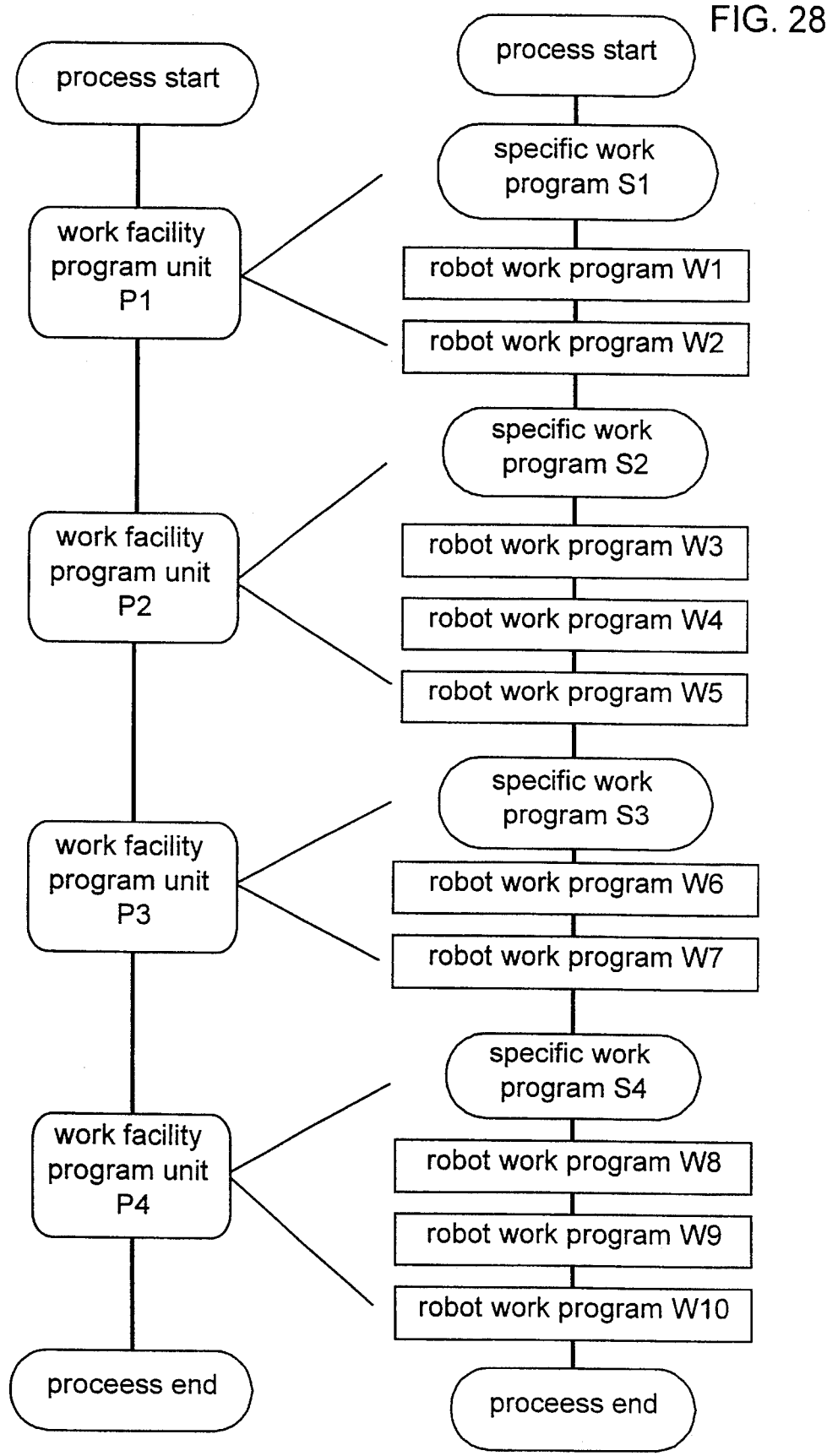
FIG. 28 is a chart illustrating a program for processing of the parts by combination of the robot and the specific work facility.
Figure 29:
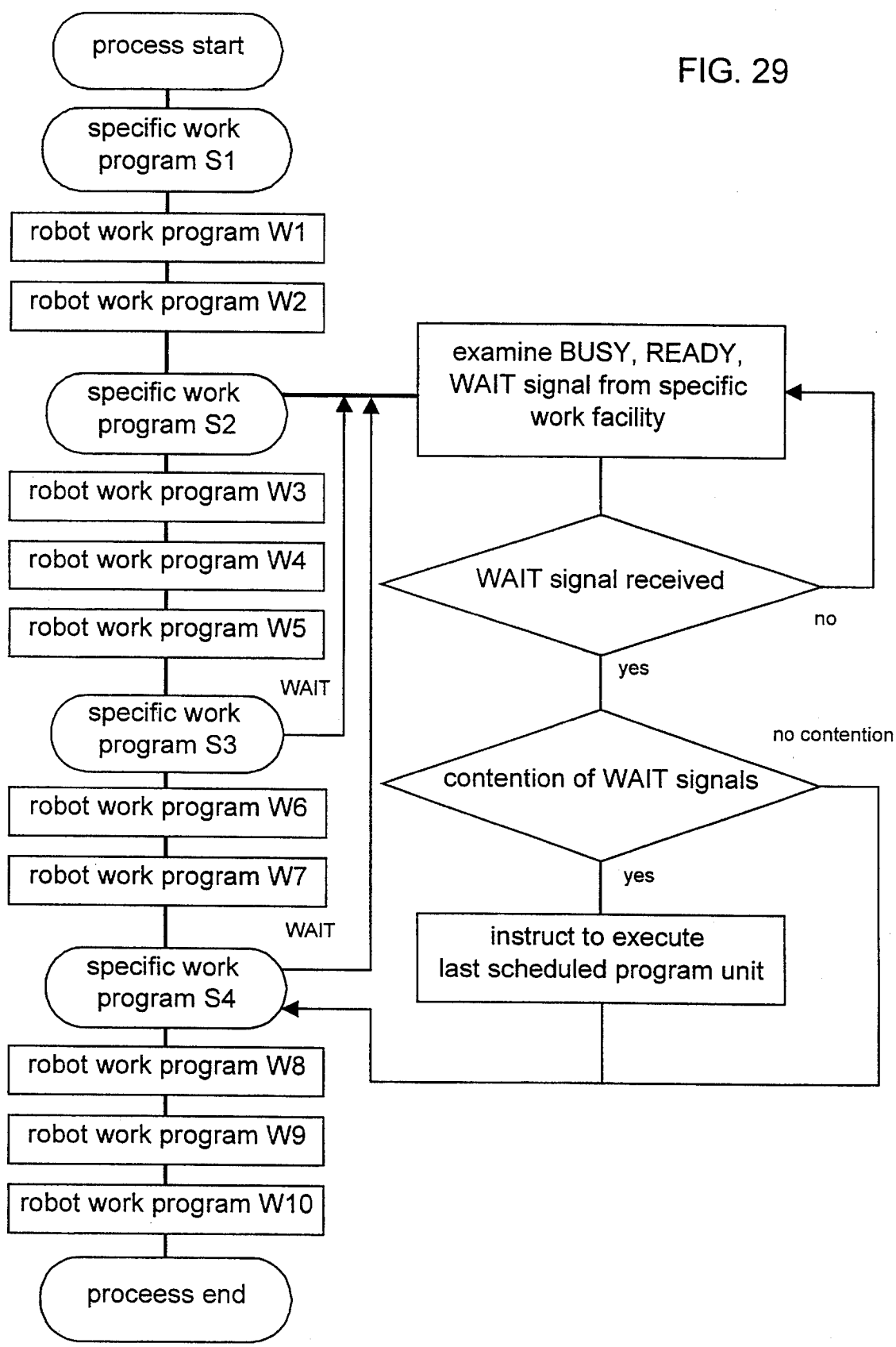
FIG. 29 is a chart illustrating a work status monitor program.

Now, control of the machine will be discussed with reference to FIGS. 27 to 29. The control center 70 is responsible for multi-task operations to execute five programs composed of:

1) a robot control program, 2) a robot interference management program, 3) a robot sequence program, 4) a work table control program, and 5) a trouble supervision program.

The robot control program specifies the operation of the robot into separate actions which are classified as and described in the order of attachment of the operator hand 40;

movement outside of the common work region R; part assembly outside of the common work region R; movement into the common work region R; part assembly within the common work region R; movement beyond the common work region R; and detachment of the operator hand 40. The robot control program further includes an action entry for specifying which of the above actions is selected; and a part information entry for specifying information about the parts supply station 60, for example, an arrangement of the tray 62 on the station 60. These entries are placed in precedence to the above robot actions. The above program sequence is executed in a repeated manner to perform desired part assembly requiring multi-stage processing.

The robot interference management program is responsible for monitoring whether either one of the robots 30 is positioned within the common work region R and controlling the robots 30 to operate without being interfered with each other. The program recognizes angular information of the arms 31 of the individual robots 30 to provide position data for the robots 30. When one of the robot is monitored to be outside of the common work region R, the program allows the other robot to operate within the common work region R. When, on the other hand, the one robot is within the common work region R, the program prohibits the other robot 30 from operating in the common work region R. However, when it is required to actuate the robots in cooperation with each other, the program monitors precise locations within the common work region R for the individual robots in order to control the movement of the robots within the common work region R in consideration of the configuration of the operator hands 40 and the parts being in use, for avoiding an interference between the robots 30.

The robot sequence program specifies a predetermined operation sequence of the robots and is responsible for controlling the repeating cycles of executing the above robot control program.

The work table control program controls the movement of the work table 20 under the instruction of the robot control program at a suitable timing.

The trouble supervision program supervises an error during the part assembly to stop operating the robots and/or jumps into a trouble escape program depending upon the types of the error.

The above five programs for controlling the operations by the robots are associated with a supplementary program for controlling the operations by the specific work facility 80. In order to enable parallel processing of the operations by the robots 30 and by the specific work facility 80, a hyper-control program is provided to relate the processing by the robots 30 with the processing by the specific work facility 80. For example, the hyper-control program comprises, as shown in the right hand of FIG. 28, four specific work programs S1 to S4 by the work facilities 80 and ten robot work programs W1 to W10 by the robots 30. In this illustrated example in which the specific work programs S1 to S4 alternate the robot work programs W1 to W10, the hyper-control program makes five program units P1 to P2, as shown in the left hand side of FIG. 28, each starting with the single specific work program followed by the robot work programs, and control the total part assembly program by executing the program units step by step. The above robot work programs W1 to W10 by the robot 30 are made to effect the part assembly in accordance with the above five programs as shown in FIG. 27. The specific work program S1 to S4 is written to control fetching of a work status signal between the specific work facility and the hyper-control program. The work status signal includes a BUSY signal indicating that the specific work facility 80 is in operation, a READY signal indicating that the specific work facility 80 has completed the intended processing, and a WAIT signal indicating the specific work program requires the processing by the specific work facility 80. The processing by the specific work facility 80 itself is made in accordance with a own program provided in a sequencer on the side of the specific work facility 80. With the use of the hyper-control program for controlling the processing by way of the separate program units, the hyper-program can deal with necessary input/output signals successfully without causing interference with the individual processing performed by the program units.

In order to achieve efficient processing including the specific work, the hyper-control program allows the individual program units to be executed on a priority basis. Upon completion of executing each program unit, the hyper-control program examines whether the remaining program units require the specific work program. When, as shown in FIG. 29, there occurs a contention between two or more program units requiring the specific work programs S2 to S4, after first program unit has been executed to complete the intended processing by the specific work facility 80 and the robot 30, the hyper-control program instructs to execute the last scheduled program unit (including the specific work program S4) in precedence to the others. That is, as seen in the flow chart in the right hand side of FIG. 29, the hyper-control program examines the BUSY, READY, and WAIT signal from the unfinished program units (including the specific work programs S2 to S4 in this instance) and allows to execute the robot work programs in the next program unit when no WAIT signal is received from any one of the remaining program units. When there occurs a contention that the WAIT signals are received from two or more program units, the hyper-control program instructs to execute the last scheduled program unit. Thus, it is possible to effectively operate the robots 30 in case when one of the specific work facilities 80 temporarily fails to operate, thereby increasing MTBF (mean time before failure) for the part assembly.

Figure 30:
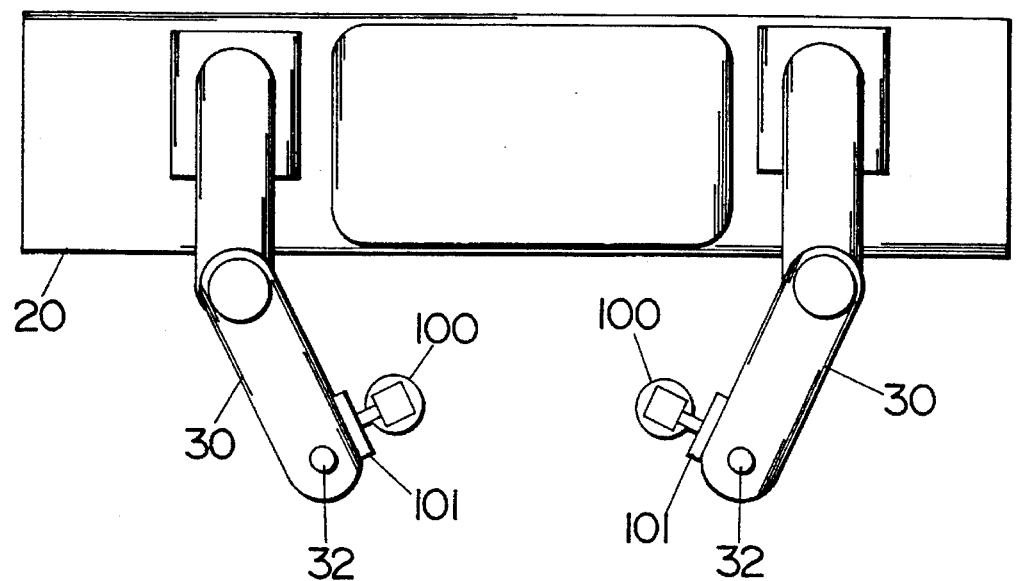
FIG. 30 is a plan view of the machine with television cameras attached to the robots.
Figure 31:
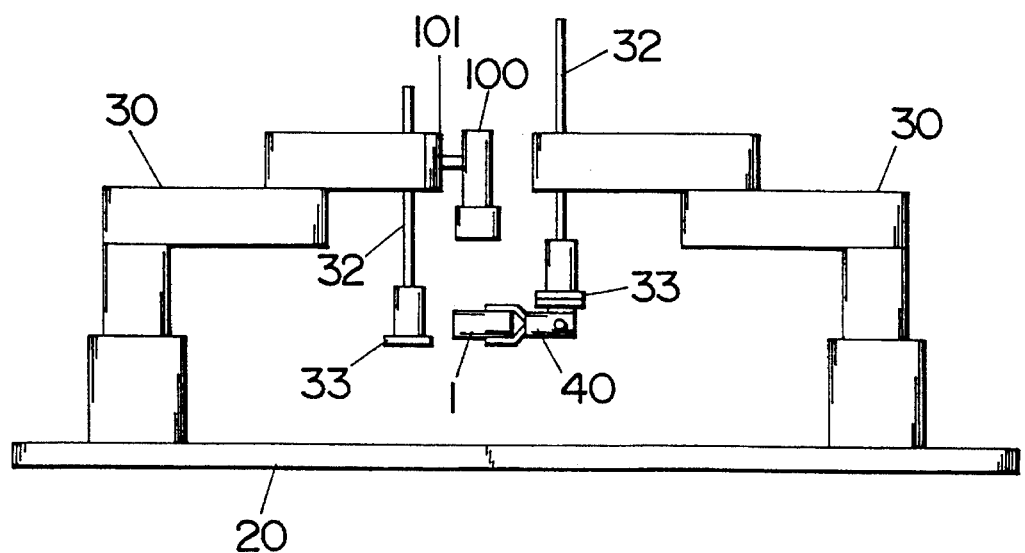
FIG. 31 is front view illustrating an attachment for mounting the television camera to the robot.
Figure 32:
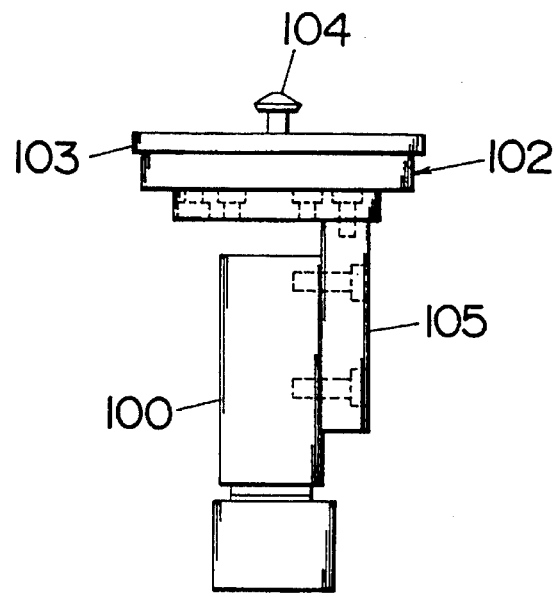
FIGS. 32 and 33 are schematic views respectively illustrating the operations of the robots with television camera attached thereto.
Figure 33:
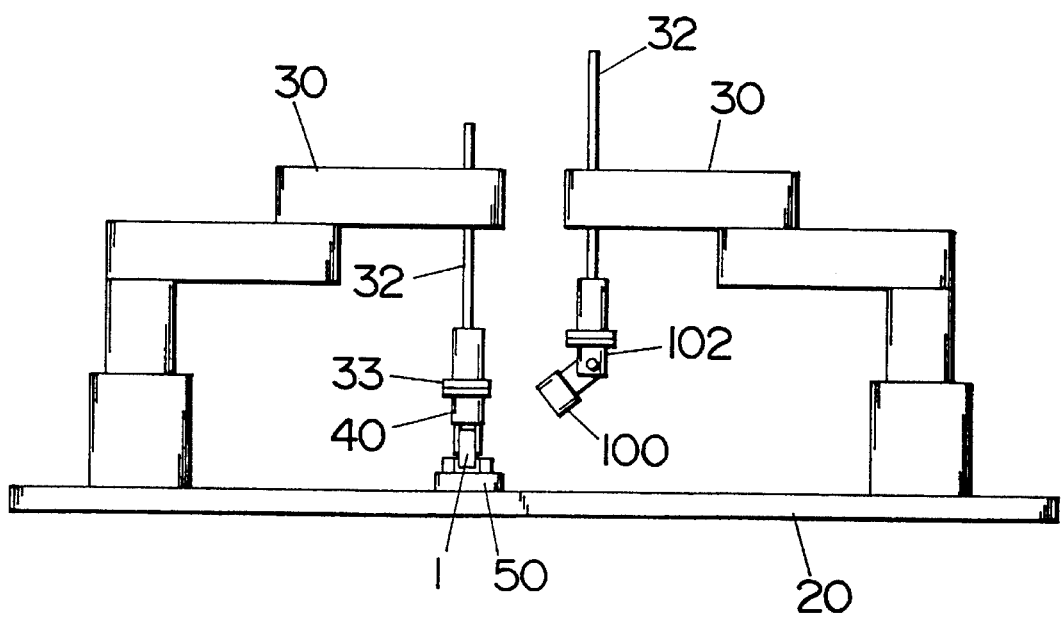

As shown in FIG. 30, the robot 30 may carry a television camera 100 such as a CCD camera, in addition to the operator hand, for monitoring the parts being assembled by the operator hand, in the manner as shown in FIG. 31. In this instance, the camera 100 is connected to the arm 31 of the robot 30 at position other than the end effector 32 of the robot 30 by means of a stay 101 which is extendible in a direction along an optical axis of the camera 100 for varying the field of view by the camera. Alternately, the camera 100 may be detachably connected directly to the end effector of the robot by means of a camera hand 102 which, as shown in FIG. 32, comprises a disc 103 with a knob 104 and a stay 105 supporting the camera 100. The disc 103 is detachable to the end effector of the robot 30 by engagement of the knob 104 with the end effector in the like manner as the operator hand 30. Further, the stay 105 may have an articulated linkage to enable the angle of the television camera 100 so that, as shown in FIG. 33, the camera 100 can be suitably angled for monitoring the part 1. With the use of the camera, the part can be readily checked before or after being assembled in order to compensate for an error in positioning the parts by the robot 30 or to facilitate the detection of an assembly error.

What is claimed is:

1. An automated parts assembling machine comprising:

a work table supported to a base and movable relative thereto;

at least two separate robots each having an end effector movable around within an individual work region, said at least two separate robots positioned in such a relation as to give a common work region in which individual work regions of said at least two separate robots overlap;

parts supply means arranged adjacent to said work table for storing parts to be picked-up by said at least two separate robots;

a plurality of operator hands selectively and removably attached to at least one of said end effector of said at least two separate robots for handling parts;

jig means disposed within said common region in order to position said parts for assembly by said at least two separate robots;

control means for controlling operations of said at least two separate robots and moving said work table;

wherein said at least two separate robots are mounted on said movable work table together with said operator hands and said jig means, said at least two separate robots spaced in a moving direction of said work table, and wherein said parts supply means extends in the moving direction of said work table.

2. An automated part assembly machine as set forth in claim 1, wherein said plurality of operator hands comprises a combination hand by which at least one robot of said at least two separate robots is capable of handling a first part and a second part in cooperation with each other.

3. An automated part assembly machine as set forth in claim 1, wherein said jig means comprises a first holder and a second holder different from said first holder, each of which retains a part at different orientations.

4. An automated part assembly machine as set forth in claim 1, wherein said jig means is mounted on a base plate detachable to said work table.

5. An automated part assembly machine as set forth in claim 1, wherein said jig means comprises a catch means by which said jig means is detachably connected to an end effector of at least one robot of said two separate robots so that said jig means can be transferred out of said work table but within said work region of said robot.

6. An automated part assembly machine as set forth in claim 5, wherein said jig means comprises a latch means which locks a part to a particular position on said jig means when said jig means is kept connected to said at least one robot and which releases said part when said jig means rests on said work table.

7. An automated part assembly machine as set forth in claim 1, wherein said jig means comprises a shuttle jig which receives a part, said shuttle jig detachably connected to an end effector of at least one robot of said at lest two separate robots so that said part can be transferred by said at least one robot as being received in said shuttle jig.

8. An automated part assembly machine as set forth in claim 1, further comprises a stand for receiving at least one of said operator hands, said stand located within said common work region so that said at least one of said operator hands is accessible from each of said at least two separate robots.

9. An automated part assembly machine as set forth in claim 1, wherein said parts supply means comprises an additional operator hand and additional jig means at a region commonly accessibly from said at least two separate robots.

10. An automated part assembly machine as set forth in claim 1, wherein said parts supply means extends in such a manner as to surround said work table.

11. An automated part assembly machine which comprises plural sets of said work table, said at least two separate robots, said parts supply means, said operator hands, and said jig means as defined in claim 1.

12. An automated part assembly machine as set forth in claim 1, wherein said base has an extension for extending a movable range of said work table.

13. An automated part assembly machine as set forth in claim 1, wherein said movable table is driven through a rack-and-pinion.

14. An automated part assembly machine as set forth in claim 1, wherein said base includes tie means for detachably mounting said parts supply means and an associated facility for part assembly.

15. An automated part assembly machine as set forth in claim 1, wherein said control means operates by parallel processing of five programs composed of:

1) a robot control program, 2) a robot interference management program, 3) a robot sequence program, 4) a work table control program, and 5) a trouble supervision program;

wherein said robot control program specifies the operation of said at least two separate robots into separate actions which are classified as and described in order of:

attachment of said operator hand;

movement outside of said common work region;

assembly of said parts outside of said common work region; movement into said common work region;

part assembly within said common work region;

movement beyond said common work region; and detachment of said operator hand, said robot control program further including an action entry for specifying which of the above actions is selected; and a part information entry for specifying information about said parts supply means;

wherein said robot interference management program monitors whether either one of said at least two separate robots are positioned within said common work region; wherein said robot sequence program specifies the operation sequence of said at least two separate robots; and wherein said work table control program controls the movement of said work table; and wherein said trouble supervision program supervises an error in said part assembly action.

16. An automated part assembly machine as set forth in claim 1, wherein said control means controls a position of one of said at least two separate robots outside of said common work region while another of said at least two separate robots is in said common work region.

17. An automated part assembly machine as set forth in claim 1, further including specific work facility means disposed adjacent at least one robot of said at least two separate robots to effect a specific work not made by said at least one robot, wherein said control means controls to effect parallel processing of said specific work facility means with said at least one robot.

18. An automated part assembly machine as set forth in claim 17, wherein said control means operates in accordance with a control program composed of plural program units, each of said program units describing a routine of instructing said specific work at said specific work facility means followed by effecting the assembly of said parts by said at least two separate robots, said program units being executed sequentially for completing the assembly of said parts.

19. An automated part assembly machine as set forth in claim 18, wherein said control means includes a work status monitor program which monitors whether said specific work facility means provide a wait signal indicative of waiting for the specific work and which delivers, to a particular one of said program units assigned to said one of the specific work facility means issuing said wait signal, a control of executing the specific work in accordance with said particular program unit, wherein said work status monitor program, when receiving wait signals from two or more of said specific work facility means, delivers said control to one of the program units assigned to the specific work facility which is scheduled later than the other in a predetermined order of executing the specific work.

20. An automated part assembly machine as set forth in claim 1, including a television camera monitoring said parts.

21. An automated part assembly machine as set forth in claim 20, wherein said television camera is mounted to an arm of at least one robot of said at least two separate robots.

22. An automated part assembly machine as set forth in claim 20, wherein said television camera is detachably mounted to at least one robot of said at least two separate robots.

23. An automated part assembly machine as set forth in claim 20, wherein said television camera is mounted in such a manner as to vary a field of view.

\* \* \* \* \*